(12) United States Patent
Van Diggelen et al.

(10) Patent No.: US 8,963,773 B2
(45) Date of Patent: Feb. 24, 2015

(54) METHOD AND APPARATUS FOR MAINTAINING INTEGRITY OF LONG-TERM ORBITS IN A REMOTE RECEIVER

(71) Applicant: Global Locate, Inc., Irvine, CA (US)

(72) Inventors: Frank Van Diggelen, San Jose, CA (US); Matthew Riben, Cupertino, CA (US)

(73) Assignee: Global Locate, Inc., Irvine, CA (US)

( * ) Notice: Subject to any disclaimer, the term of this patent is extended or adjusted under 35 U.S.C. 154(b) by 0 days.

(21) Appl. No.: 13/924,069

(22) Filed: Jun. 21, 2013

(65) Prior Publication Data

US 2013/0285851 A1 Oct. 31, 2013

Related U.S. Application Data

(60) Division of application No. 12/857,295, filed on Aug. 16, 2010, now abandoned, which is a continuation-in-part of application No. 11/289,959, filed on Nov. 30, 2005, now Pat. No. 7,589,667, which (Continued)

(51) Int. Cl.
*G01S 19/27* (2010.01)
*G01S 19/25* (2010.01)
(Continued)

(52) U.S. Cl.
CPC .............. *G01S 19/27* (2013.01); *G01S 19/05* (2013.01); *G01S 19/20* (2013.01); *G01S 19/258* (2013.01); *G01S 19/254* (2013.01)
USPC .............. 342/357.66; 342/357.58; 342/357.64

(58) Field of Classification Search
CPC ......... G01S 19/27; G01S 19/40; G01S 19/20; G01S 19/258

USPC .............................. 342/357.66, 357.4, 357.58
See application file for complete search history.

(56) References Cited

U.S. PATENT DOCUMENTS

| | | |
|---|---|---|
| 4,445,118 A | 4/1984 | Taylor et al. |
| 4,894,662 A | 1/1990 | Counselman |

(Continued)

FOREIGN PATENT DOCUMENTS

| | | |
|---|---|---|
| CA | 2177310 A1 | 12/1996 |
| EP | 1 197 761 B1 | 4/2002 |

(Continued)

OTHER PUBLICATIONS

Aparicio., M., et al. "GPS Satellite and Payload," Global Positioning System: Theory and Applications vol. I, Progress in Astronautics and Aeronautics, vol. 163, Ch. 6, pp. 209-244, 1996.

(Continued)

*Primary Examiner* — Gregory C Issing
(74) *Attorney, Agent, or Firm* — Sterne, Kessler, Goldstein & Fox P.L.L.C.

(57) ABSTRACT

A method and apparatus for maintaining integrity of long-term-orbit information used by a Global-Navigation-Satellite-System or other positioning receiver is described. The method comprises obtaining a predicted pseudorange from a first set of long-term-orbit information possessed by a positioning receiver; obtaining, at the positioning receiver from at least one satellite, a measured pseudorange; determining validity of the predicted pseudorange as a function of the predicted pseudorange and the measured pseudorange; and excluding from the long-term-orbit information at least a portion thereof when the validity of the predicted pseudorange is deemed invalid. Optionally, the method may comprise updating or otherwise supplementing the long-term-orbit information with other orbit information if the validity of the predicted pseudorange is deemed invalid.

20 Claims, 11 Drawing Sheets

Related U.S. Application Data is a continuation of application No. 10/712,807, filed on Nov. 13, 2003, now Pat. No. 6,992,617, said application No. 12/857,295 is a continuation-in-part of application No. 11/567,629, filed on Dec. 6, 2006, now abandoned, which is a continuation-in-part of application No. 11/333,787, filed on Jan. 17, 2006, now Pat. No. 7,443,340, which is a continuation-in-part of application No. 09/993,335, filed on Nov. 6, 2001, now Pat. No. 7,053,824, which is a continuation-in-part of application No. 09/884,874, filed on Jun. 19, 2001, now Pat. No. 6,560,534, which is a continuation-in-part of application No. 09/875,809, filed on Jun. 6, 2001, now Pat. No. 6,542,820.

(51) Int. Cl.
  *G01S 19/20* (2010.01)
  *G01S 19/05* (2010.01)

(56) References Cited

U.S. PATENT DOCUMENTS

| | | | |
|---|---|---|---|
| 5,043,736 | A | 8/1991 | Darnell et al. |
| 5,119,504 | A | 6/1992 | Durboraw, III |
| 5,223,844 | A | 6/1993 | Mansell et al. |
| 5,225,842 | A | 7/1993 | Brown et al. |
| 5,365,450 | A | 11/1994 | Schuchman et al. |
| 5,375,059 | A * | 12/1994 | Kyrtsos et al. ............... 701/470 |
| 5,408,237 | A | 4/1995 | Patterson et al. |
| 5,417,217 | A | 5/1995 | Morita et al. |
| 5,418,537 | A | 5/1995 | Bird |
| 5,430,657 | A * | 7/1995 | Kyrtsos ...................... 701/469 |
| 5,504,492 | A | 4/1996 | Class et al. |
| 5,506,781 | A | 4/1996 | Cummiskey et al. |
| 5,589,833 | A | 12/1996 | Randall et al. |
| 5,631,838 | A * | 5/1997 | Ishikawa et al. ............ 701/468 |
| 5,663,735 | A | 9/1997 | Eshenbach |
| 5,673,256 | A | 9/1997 | Maine |
| 5,726,893 | A | 3/1998 | Schuchman et al. |
| 5,736,960 | A | 4/1998 | Murphy et al. |
| 5,760,737 | A * | 6/1998 | Brenner ................. 342/357.58 |
| 5,786,789 | A | 7/1998 | Janky |
| 5,808,581 | A | 9/1998 | Braisted et al. |
| 5,828,336 | A | 10/1998 | Yunck et al. |
| 5,841,396 | A | 11/1998 | Krasner |
| 5,845,227 | A | 12/1998 | Peterson |
| 5,874,914 | A | 2/1999 | Krasner |
| 5,877,724 | A | 3/1999 | Davis |
| 5,889,492 | A | 3/1999 | Kurby et al. |
| 5,893,044 | A | 4/1999 | King et al. |
| 5,913,170 | A | 6/1999 | Wortham |
| 5,917,444 | A | 6/1999 | Loomis et al. |
| 5,938,721 | A | 8/1999 | Dussell et al. |
| 5,943,014 | A | 8/1999 | Gilhousen |
| 5,945,944 | A | 8/1999 | Krasner |
| 5,963,167 | A | 10/1999 | Lichten et al. |
| 5,983,109 | A | 11/1999 | Montoya |
| 5,999,124 | A | 12/1999 | Sheynblat |
| 6,016,117 | A | 1/2000 | Nelson, Jr. |
| 6,052,081 | A | 4/2000 | Krasner |
| 6,064,336 | A | 5/2000 | Krasner |
| 6,067,045 | A | 5/2000 | Castelloe et al. |
| 6,067,484 | A | 5/2000 | Rowson et al. |
| 6,081,229 | A | 6/2000 | Soliman et al. |
| 6,084,544 | A | 7/2000 | Camp, Jr. |
| 6,085,128 | A | 7/2000 | Middour et al. |
| 6,097,974 | A | 8/2000 | Camp, Jr. et al. |
| 6,107,960 | A | 8/2000 | Krasner |
| 6,121,923 | A | 9/2000 | King |
| 6,122,506 | A | 9/2000 | Lau et al. |
| 6,131,067 | A | 10/2000 | Girerd et al. |
| 6,133,874 | A | 10/2000 | Krasner |
| 6,134,483 | A | 10/2000 | Vayanos et al. |
| 6,138,074 | A | 10/2000 | Gower et al. |
| 6,150,980 | A | 11/2000 | Krasner |
| 6,178,195 | B1 | 1/2001 | Durboraw, III et al. |
| 6,188,351 | B1 | 2/2001 | Bloebaum |
| 6,204,808 | B1 | 3/2001 | Bloebaum et al. |
| 6,211,819 | B1 | 4/2001 | King et al. |
| 6,215,441 | B1 | 4/2001 | Moeglein et al. |
| 6,215,442 | B1 | 4/2001 | Sheynblat et al. |
| 6,222,483 | B1 | 4/2001 | Twitchell et al. |
| 6,239,742 | B1 | 5/2001 | Krasner |
| 6,256,475 | B1 | 7/2001 | Vannucci |
| 6,272,316 | B1 | 8/2001 | Wiedeman et al. |
| 6,285,315 | B1 | 9/2001 | Pratt |
| 6,289,279 | B1 | 9/2001 | Ito et al. |
| RE37,408 | E | 10/2001 | Loomis et al. |
| 6,313,787 | B1 | 11/2001 | King et al. |
| 6,323,804 | B1 | 11/2001 | Kurby et al. |
| 6,369,751 | B1 | 4/2002 | Naruse |
| 6,373,432 | B1 | 4/2002 | Rabinowitz et al. |
| 6,377,585 | B1 | 4/2002 | Funderburk et al. |
| 6,411,892 | B1 | 6/2002 | van Diggelen |
| 6,411,899 | B2 | 6/2002 | Dussell et al. |
| 6,417,801 | B1 | 7/2002 | van Diggelen |
| 6,420,999 | B1 | 7/2002 | Vayanos |
| 6,424,890 | B1 | 7/2002 | Syrjärinne et al. |
| 6,427,120 | B1 | 7/2002 | Garin et al. |
| 6,429,808 | B1 | 8/2002 | King et al. |
| 6,433,735 | B1 | 8/2002 | Bloebaum et al. |
| 6,437,735 | B1 | 8/2002 | McMahan |
| 6,453,237 | B1 | 9/2002 | Fuchs et al. |
| 6,466,846 | B2 | 10/2002 | Maynard |
| 6,542,820 | B2 | 4/2003 | LaMance et al. |
| 6,570,530 | B2 * | 5/2003 | Gaal et al. ................ 342/357.23 |
| 2002/0024461 | A1 | 2/2002 | Moeglein et al. |
| 2002/0032526 | A1 | 3/2002 | Diggelen |
| 2002/0049536 | A1 | 4/2002 | Gaal |
| 2002/0050944 | A1 | 5/2002 | Sheynblat et al. |
| 2002/0172313 | A1 | 11/2002 | Smith et al. |
| 2002/0188403 | A1 | 12/2002 | LaMance et al. |
| 2002/0198657 | A1 | 12/2002 | Robbins |
| 2003/0023379 | A1 | 1/2003 | Diggelen et al. |
| 2003/0098810 | A1 | 5/2003 | Lee et al. |
| 2003/0107513 | A1 | 6/2003 | Abraham et al. |
| 2003/0151547 | A1 | 8/2003 | Mauro et al. |
| 2003/0212821 | A1 | 11/2003 | Gillies et al. |
| 2003/0223422 | A1 | 12/2003 | Igarashi et al. |
| 2004/0088111 | A1 | 5/2004 | Ahlbrecht et al. |
| 2004/0117114 | A1 | 6/2004 | Diggelen |
| 2004/0203853 | A1 | 10/2004 | Sheynblat |
| 2004/0203915 | A1 | 10/2004 | van Diggelen et al. |
| 2004/0263386 | A1 | 12/2004 | King et al. |
| 2005/0003833 | A1 | 1/2005 | Younis |
| 2006/0038719 | A1 | 2/2006 | Pande et al. |
| 2006/0181452 | A1 | 8/2006 | King et al. |
| 2007/0200752 | A1 | 8/2007 | van Diggelen et al. |
| 2008/0186229 | A1 | 8/2008 | van Diggelen et al. |
| 2011/0133985 | A1 | 6/2011 | van Diggelen et al. |

FOREIGN PATENT DOCUMENTS

| | | |
|---|---|---|
| EP | 1 637 900 A1 | 3/2006 |
| GB | 2 307 812 A | 6/1997 |
| WO | WO 89/12835 A1 | 12/1989 |
| WO | WO 98/09181 A1 | 3/1998 |
| WO | WO 99/19743 A1 | 4/1999 |
| WO | WO 99/56145 A1 | 11/1999 |
| WO | WO 00/75685 A1 | 12/2000 |
| WO | WO 01/73467 A2 | 10/2001 |
| WO | WO 01/75473 A2 | 10/2001 |
| WO | WO 02/103383 A2 | 12/2002 |
| WO | WO 03/010912 A2 | 2/2003 |

OTHER PUBLICATIONS

Bertiger, W.I., et al. "GPS Precise Tracking of Topex/Poseidon: Results & Implications," Submitted for Publication to JGR TOPEX/Poseidon Special Issue, http://hdl.handle.net/2014/33763, Nov. 1993.

(56) References Cited

OTHER PUBLICATIONS

Bertiger, W.I., et al., "GPS precise tracking of TOPEX/Poseidon: Results and Implications," Journal of Geophysical Research, vol. 99, No. C12, pp. 24, 449-24, 464, Dec. 15, 1994.
Cameron, M., et al., "Intelligent Transportation System Mayday Becomes a Reality", Navsys Corporation, IEEE 1985 (1985), 340-347.
Chansarkar, M., et al. "Acquistion of GPS Signals at Very Low Signal to Noise Ratio,"ION NTM 2000, Anaheim, CA, pp. 731-737, Jan. 26-28, 2000.
Commission Investigative Staff's Notice of Prior Art, Certain GPS Devices and Products Containing Same, United States International Trade Commission Investigation No. 337-TA-602, Feb. 15, 2008.
Commission Opinion, Certain GPS Devices and Products Containing Same, United States International Trade Commission Investigation No. 337-TA-602, Jan. 27, 2009.
Complainants' Notice of Prior Art Pursuant to Ground Rule 5, Certain GPS Devices and Products Containing Same, United States International Trade Commission Investigation No. 337-TA-602, Feb. 15, 2008.
Complainants' First Amended Complaint under Section 337 of the Tariff Act of 1930, as Amended, Certain GPS Devices and Products Containing Same, United States International Trade Commission Investigation No. 337-TA-602, Feb. 8, 2008.
International Search Report mailed Jul. 10, 2007 for PCT Application No. PCT/US2007/001187.
International Search Report mailed Aug. 21, 2003 for PCT Application No. PCT/US02/35311.
International Search Report, dated Mar. 17, 2004 for corresponding PCT application, PCT/US03/30872.
Written Opinion mailed Jul. 10, 2007 for PCT/US2007/001187.
PCT International Preliminary Report on Patentability of International Search Authority mailed May 26, 2006 for PCT Application No. PCT/US2004/038117.
International Search Report mailed Apr. 18, 2005 for PCT Application No. PCT/US2004/038117.
PCT Written Opinion, of International Search Authority mailed Apr. 18, 2005 for PCT Application No. PCT/US2004/038117.
Diesposti, Raymond, et al., "Of Mutual Benefit: Merging GPS and Wireless Communications," GPS World, vol. 9, No. 4, pp. 44-48, Apr. 1998.
Diesposti, Raymond, et al., "The Benefits of Integrating GPS, INS and PCS," The Aerospace Corp., ION-GPS-98, Session D1, Receiver Systems and Technology 1: New Receiver Architectures & Signal Processing Strategies, Nashville Convention Center, Nashville, Tennessee, pp. 327-331, Sep. 15-18, 1998.
Dietrich, F. J., "The Globalstar Cellular Satellite System", IEEE Transaction on Antennas and Propagation. 46(6). Publisher item Identifiers 0018-926X(98), (Jun. 1998), 935-942.
Djuknic, Goran M., et al., "Geolocation and Assisted GPS", Computer vol. 34, Issue 2 (Feb. 2001), 123-125.
Enge. P.K., et al. "Wide Area Augmentation System," Global Positioning System: Theory and Applications vol. II, Progress in Astronautics and Aeronautics, vol. 164, Ch. 4, pp. 117-142, 1996.
European Search Report corresponding to European Patent Application No. 07023669.0-2220, completed Mar. 25, 2008, 3 pages.
Expert Report of Stephen Heppe Regarding Invalidity of U.S. patent Nos. 6,417,801, 6,606,346, 6,652,000, 6,704,651, 6,937,187, and 7,158,080, Feb. 25, 2008.
File History—U.S. Appl. No. 10/081,164, Feb. 22, 2002.
First Supplemental Report of Dr. Stephen Heppe Regarding Invalidity of U.S. Patent Nos. 6,417,801, 6,606,346, 6,937,187 and 7,158,080, Apr. 14, 2008.
Francisco, Sherman G., "GPS Operational Control Segment," Global Positioning System: Theory and Applications, Ch. 10, pp. 435-466, 1994.
Garin, T.J., et al. "Wireless Assisted GPS-SiRF Architecture and Field Test Results," ION GPS '99, Nashville, TN, pp. 489-497, Sep. 14-17, 1999.

Gratton et al., "Orbit Ephemeris Monitors for Category I LAAS." Postion Location and Navigation Symposium, 2004.
Hanna Sairo et al., "Multiple Level Integrity Monitoring in Assisted GPS." Proceedings of ION GPS 2002, Sep. 24, 2002, pp. 2129-2134.
Initial Determination, Certain GPS Devices and Products Containing Same, United States Internatinoal Trade Commission Investigation No. 337-TA-602, Public Version, Nov. 25, 2008.
International GPS Service for Geodynamics, 1996 Annual Report, IGS Central Bureau, Nov. 1997.
International GPS Service for Geodynamics, 1997 Technical Reports, IGS Central Bureau, Oct. 1998.
International GPS Service for Geodynamics, 1999 Technical Reports, IGS Central Bureau, pp. 13-164, Nov. 2000.
International GPS Service for Geodynamics, 2000 Technical Reports, IGS Central Bureau, pp. 71-148, Nov. 2001.
Johnson, Lt. Gregory W., "Communications Technologies for Automated Dependent Surveillance", USCG Research & Develooment Center (1995), 40-44.
Lamance, J., et al. "Assisted GPS—Low Infrastructure Approach," GPS World, vol. 13, No. 3, pp. 46-51, Mar. 2002.
Makino, H., "Development of Navigation System for the Blind Using GPS and Mobile Phone Combination", 18th Annual International Conference of the IEEE Enaincerina in Medicine and Biology Society (1996), 506-507.
Mehaffey, J. "Garmin's signal strength bars: What they mean and the meaning of Warm Start, Cold Start, Auto locate and Search the Sky," Jul. 1999, gpsinformation.netlmain/warmcold.htm.
Melbourne, W.G., et al. "Scientific Applications of GPS on Low Earth Orbiters," Jet Propulsion Laboratory, California Institute of Technology, http://hdl.handle.net/2014/32419, 1994.
Navstar GPS, ICD-GPS-200, Revision C, Oct. 10, 1993, Oct. 13, 1995, Sep. 25, 1997, Oct. 1, 1999, Apr. 12, 2000, Jan. 14, 2003.
Navstar GPS, Interface Control Document GPS (200). Jul. 1, 1992.
Navstar GPS Space Segment / Navigation User Interfaces, ICD-GPS-200, Jul. 3, 1991.
Neilan, Ruth E., et al., "The International GPS Service: A Global Resource for GPS Applications and Research," Institute of Navigation, ION GPS-97, 10th International Technical Meeting, Kansas City, Missouri, Sep. 16-19, 1997.
Rebuttal Expert Report of Phil Dafesh Regarding U.S. Patent Nos. 6,651,000 and 7,158,080 in Response to Expert Report of Stephen Heppe, Redacted-Non-Confidential Version, Mar. 10, 2008.
Respondent SiRF Technology, Inc.'s First Supplemental Objections and Responses to Global Locate, Inc.'s First Set of Interrogatories (Nos. 22, 23 and 49) and Exhibits 23-27, Aug. 24, 2007.
Respondent SiRF Technology, Inc.'s Sixth Supplemental Objections and Responses to Global Locate, Inc.'s First Set of Interrogatories (Nos. 19, 21-23, and 27-28), Apr. 13, 2008.
Respondents' (Mio Technology Limited, USA; MiTAC International Corporation; Pharos Science & Applications, Inc.; E-TEN Information Systems Co. Ltd.) First Supplemental Objections and Responses in Common to Global Locate, Inc.'s First Set of Interrogatories (Nos. 22, 23 and 49) and Exhibits 23-27, Aug. 31, 2007.
Respondents' First Supplemental Corrected Notice of Prior Art, Certain GPS Devices and Products Containing Same, United States International Trade Commission Investigation No. 337-TA-602, Mar. 4, 2008.
Respondents' Notice of Prior Art, Certain GPS Devices and Products Containing Same, United States International Trade Commission Investigation No. 337-TA-602, Feb. 15, 2008.
Respondents' (Mio Technology Limited, USA; MiTAC International Corporation; Pharos Science & Applications, Inc.; E-TEN Information Systems Co. Ltd.) Fifth Supplemental Objections and Responses to Global Locate, Inc.'s First Set of Interrogatories (Nos. 19, 21-23 and 27-28), Apr. 3, 2008.
RTCM Recommended Standards for Differential NAVSTAR GPS Service, Version 2.0, RTCM Special Committee No. 104, RTCM Paper 134-89/SC 104-68, Jan. 1, 1990.
Russell, S.S., et al. "Control Segment and User Performance,"Navigation: Journal of the Institute of Navigation, vol. 25, No. 2, pp. 166-172, Summer 1978.

(56) References Cited

OTHER PUBLICATIONS

Schenewerk, Dr. Marks., et al., "Rapid Turnaround GPS Ephemerides from the National Geodetic Survey," Proceedings of the ION GPS-93, Institute of Navigation, pp. 247-255, 1993.

Second Supplemental Report of Dr. Stephen Heppe Regarding Invalidiity of U.S. Patent Nos. 7,158,080, 6,651,000 and 6,704,651, Apr. 8, 2008.

Sennott, Dr. J. W., "A High Performance Position Tracker for Embedded Paging, Cellular Telephone, adn Law Enforcement Applications", Department of Electrical and Computer Engineering and Technology, IEEE 1992 (1992), 96-103.

*SiRF* v. *Broadcom*, U.S. Court of Appeals for the Federal Circuit, 2009-1262, decided Apr. 12, 2010.

Spilker Jr., J.J., et al. "Overview of GPS Operation and Design," Global Positioning System: Theory and Applications vol. I, Progress in Astronautics and Aeronatics, vol. 163, Ch. 2, pp. 29-55, 1996.

Stewart, J. M., "Vehicle Location and Position Monitoring System Using Satellite Navigation and Cellular Telephone," LITEF GmbH 7 & 1-15, Jun. 8, 1993.

Sturza, M. A., "Architecture of the Teledesic Satellite System", Teledesic Corporation 1-7, 1995.

Van Diggelen, F., "Global Locate Indoor GPS Chipset and Services," ION-GPS-2001, Salt Lake City, Utah, pp. 1-7, Sep. 11-14, 2001.

Van Diggelen, Frank, "Global Locate Indoor GPS Chipset & Services", ION GPS 2001, Sep. 11-14, 2001, Salt Lake City, UT, USA, (Online}Sep. 11, 2001, pp. 1515-1521, XP002358532 Retrieved from the Internet: URL:http://ww.ion.org/:: (retrieved on Dec. 9, 2012).

Wheatley, C., "COMA's Dependence on Good Timing and Related Issues", IEEE International Freguency Control Symposium, Qualcomm Incorporated (1996), 1211-1218.

Yiu, K., et al. "A Low-Cost GPS Receiver for Land Navigation," Global Positioning System, Hewlett-Packard Laboratories, Palo Alto, CA, pp. 44-60, May 1982.

Young, L., et al. "GPS Precision Orbit Determination: Measured Receiver Performance," Jet Propulsion Laboratory, California Institute of Technology, http:1/hdl.handle.net/2014/35887, 1993.

Zhao, Y, "Mobile Phone Location Determination and Its Impact on Intelligent Transporation Systems," IEEE Transactions on Intelligent Transportation Systems, vol. 1, No. 1, Mar. 2000.

Zhao, Y, "Standardization of Mobile Phone Positioning for 3G Systems," IEEE Communications Magazine, Jul. 2002.

Zhao, Y., "Efficient and Reliable Data Transmission for Cellular-and-GPS-Based Mayday Systems," Motorola, Inc., Chicago Corporate Research Laboratories, IEEE 1998, 555-559.

Zumberge, J.F., et al., "Ephemeris and Clock Navigation Message Accuracy," Global Positioning System: Theory and Applications, Ch. 16, pp. 585-599, 1994.

\* cited by examiner

METHOD AND APPARATUS FOR MAINTAINING INTEGRITY OF LONG-TERM ORBITS IN A REMOTE RECEIVER

CROSS-REFERENCE TO RELATED APPLICATIONS

This application is a divisional of U.S. patent application Ser. No. 12/857,295, filed Aug. 16, 2010, which is a continuation of U.S. patent application Ser. No. 11/567,6291 filed Dec. 6, 2006, which is a continuation-in-part application of U.S. patent application Ser. No. 11/333,787, filed Jan. 17, 2006, now U.S. Pat. No. 7,443,340, which is a continuation-in-part application of U.S. patent application Ser. No. 09/993,335, filed Nov. 6, 2001, now U.S. Pat. No. 7,053,824, which is a continuation-in-part of U.S. patent application Ser. No. 09/884,874, filed Jun. 19, 2001, now U.S. Pat. No. 6,560,534, which is a continuation-in-part of U.S. patent application Ser. No. 09/875,809, filed Jun. 6, 2001, now U.S. Pat. No. 6,542,820.

U.S. patent application Ser. No. 12/857,295 is also a continuation-in-part application of U.S. patent application Ser. No. 11/289,959, filed Nov. 30, 2005, now U.S. Pat. No. 7,589,667, which is a continuation of U.S. patent application Ser. No. 10/712,807, filed Nov. 13, 2003, now U.S. Pat. No. 6,992,617.

This application contains subject matter that is related to U.S. patent application Ser. No. 09/715,860, filed Nov. 17, 2000, now U.S. Pat. No. 6,417,801. Each of the aforementioned related patents and/or patent applications is herein incorporated by reference.

BACKGROUND OF THE INVENTION

1. Field of the Invention

The present invention generally relates to position-location systems, and more particularly, to monitoring the integrity of satellite-navigation data for a Global-Navigation-Satellite System.

2. Description of the Related Art

A Global-Navigation-Satellite-System (GNSS) receiver needs satellite-navigation data, such as satellite orbits and clock models, to compute distances to each of several satellites, which in turn, may be used to compute a position of the GNSS receiver. The distances are formed by computing time delays between transmission and reception of satellite signals broadcast from satellites in view of the GNSS receiver and received by the GNSS receiver on or near the surface of the earth. The time delays multiplied by the speed of light yield the distances from the GNSS receiver to each of the satellites that are in view.

In some current, implementations, the type of satellite-navigation data acquired by the GNSS receiver is broadcast ephemeris data (or simply broadcast ephemeris) and broadcast satellite time, which are obtained by decoding satellite-navigation messages contained within the satellite signals. This broadcast ephemeris includes standard satellite orbits and clock models, and the broadcast satellite time is an absolute time associated with the entire constellation of satellites. The GNSS receiver uses the broadcast satellite time to unambiguously determine exact time of broadcast (e.g., by time tagging the transmission and reception) for each of the satellite signals.

With knowledge of the exact time of broadcast of each of the satellite signals, the GNSS receiver uses the broadcast ephemeris to calculate a satellite position for each of the satellites (i.e., where each of the satellites was) when it broadcast its corresponding satellite signals. The satellite positions along with the distances to the each of the satellites allow the position of the GNSS receiver to be determined.

By way of example, a Global Positioning System (GPS) receiver (i.e., one possible embodiment of the GNSS receiver) may receive from each orbiting GPS satellites in view of the GPS receiver a number of GPS signals that are formed using unique pseudo-random noise (PN) codes. These PN odes are commonly known as C/A codes, and each is used by the GPS receiver to uniquely identity which of the GPS satellites broadcast such the GPS signals. The GPS receiver determines the aforementioned time delays by comparing time shifts between or otherwise correlating sequences of (i) the PN codes of the broadcast GPS signals received at the GPS receiver and (ii) replicas of the PN codes locally generated by the GPS receiver.

At very low signal levels, the GPS receiver may obtain the PN codes of the broadcast GPS signals to provide unambiguous time delays by processing, and essentially averaging, many frames of the sequences of the PN codes. These time delays are called "sub-millisecond pseudoranges" because they are known modulo of the 1 millisecond boundaries of these frames. By resolving the integer number of milliseconds associated with each of the time delays to each of the satellite, then true, unambiguous pseudoranges may be determined. The process of resolving the unambignous pseudoranges is commonly known as "integer millisecond ambiguity resolution."

A set of four pseudoranges together with knowledge of (i) the absolute times of transmissions of the GPS signals, and (ii) satellite positions at such absolute times is sufficient to solve for the position of the GPS receiver. The absolute times of transmission are used for determining the positions of the satellites at the times of Transmission, and hence, for determining the position of the GPS receiver.

Each of the GPS satellites move at approximately 3.9 km/s, and thus, the range of such satellite, as observed from the earth, changes at a rate of at most .+−.800 m/s. Errors in absolute may result in range errors of up to 0.8 m for each millisecond of timing error. These range errors produce a similarly sized error in the GPS receiver position. Hence, absolute time accuracy of 10 ms is sufficient for position accuracy of approximately 10 m. Errors in the absolute timing of much more than 10 ms result in large position errors, and so, current and prior implementations have typically required the absolute time to have a minimum accuracy of approximately 10 milliseconds.

Downloading the broadcast ephemeris from one or more of the satellites is always slow (i.e., no faster than 18 seconds given that the GPS satellite-navigation message is 900 bits in length and broadcast in a 50 bit-per-second (bps) data stream). When in environments in which the GPS signals have very low signal strengths, downloading the broadcast ephemeris is frequently difficult and sometimes impossible. Response to these obstacles, some prior and current GPS implementations make use of a terrestrial wireless or wired communication medium for transmitting the broadcast ephemeris to a GPS. These GPS implementations are commonly known as "Assisted-Global-Positioning Systems" or, simply, AGPSs.

Recently, the GNSS began using the AGPS (or an AGPS-like system) to provide to the GNSS receiver other types of assistance information along, with or instead of the broadcast ephemeris. This assistance information may include acquisition-assistance information to assist in acquiring the satellite signals; one or more types of the satellite-navigation data, including, for example, long-term orbit and clock models (collectively LTO information), and any other information that the may be used to acquire the satellite signals and/or determine the position of the GNSS receiver.

To be able to acquire the satellite signals and/or determine the position of the GNSS receiver with appropriate accuracy, the GNSS receiver uses the assistance data only while it is valid. The assistance data (regardless of its type) is valid for a given amount of time or "validity period." For example, the validity period for acquisition-assistance information is generally several minutes. The validity period for the broadcast ephemeris is a few (i.e., 2-4) hours. The validity period for the LTO information is any amount of time greater than the validity period for the broadcast ephemeris and may be a few days, a week or more.

When the validity period expires, the assistance data has to be retired and replaced with "fresh" assistance data. Using the assistance data after its validity period expires may prevent acquisition of the satellites and/or cause a significant amount of error in a computed position of the GNSS receiver. Similarly, the satellite-navigation data, such as the ephemeris and the LTO information, may become invalid despite having an unexpired validity period.

For example, a clock within a given satellite may have drifted outside the expected range or an orbit of a given satellite may have changed beyond an expected range (i) between the time that the assistance data is delivered and used by the GNSS receiver, and/or (ii) during the validity period of the assistance data. Using such assistance data may prevent acquisition of the satellites and/or cause a significant amount of error in a computed position of the GNSS receiver.

Therefore, there exists a need in the art for a method and apparatus that monitors and maintains the integrity of assistance data delivered to a GNSS receiver.

SUMMARY

A method and apparatus for maintaining integrity of long-term-orbit information used by a GNSS or other positioning receiver is described. The method may include obtaining a predicted pseudorange from a first set of long-term-orbit information possessed by a positioning receiver; obtaining, at the positioning, receiver from at least one satellite, a measured pseudorange; determining, validity of the predicted pseudorange as a function of the predicted pseudorange and the measured pseudorange; and excluding from the long-term-orbit information at least a portion thereof when the validity of the predicted pseudorange is deemed invalid. Optionally, the method may comprise updating or otherwise supplementing the long-term-orbit information with other orbit information if the validity of the predicted pseudorange is deemed invalid.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings.

It is to be noted that the Figures in the appended drawings, like the detailed description, are examples. And as such, the Figures and the detailed description are not to be considered limiting, and other equally effective examples are possible and likely. Furthermore, like reference numerals in the Figures indicate like elements, and wherein.

DETAILED DESCRIPTION

Figure 1:
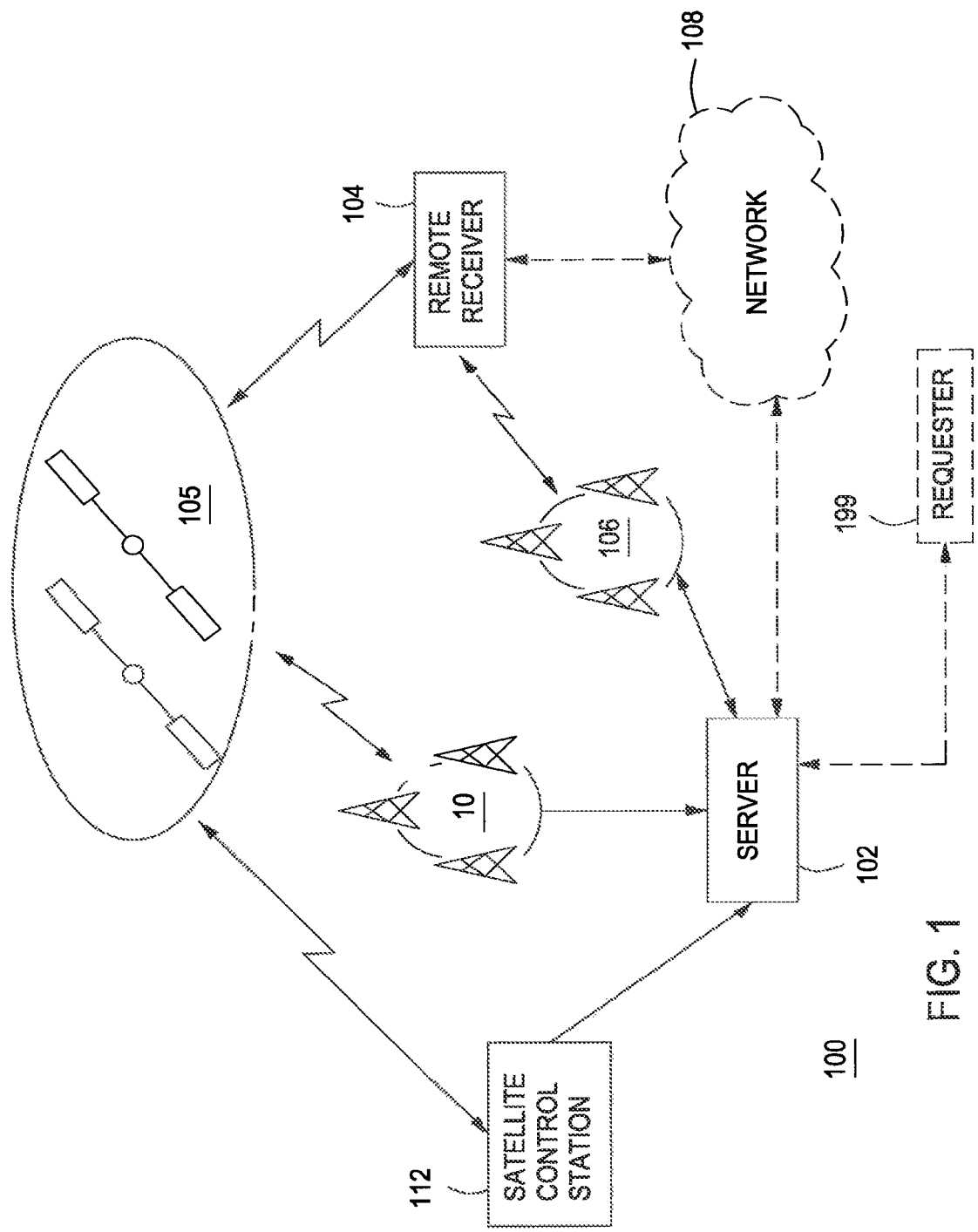
FIG. 1 is a block diagram depicting an example of a position location system.

FIG. 1 is a block diagram depicting an example of a Global Navigation Satellite System ("GNSS") 100. The GNSS 100 includes a plurality or constellation of satellites for transmitting satellite signals, as represented satellites 105, a GNSS receiver 104 for receiving the satellite signals, and a server 102. The satellites 105, the GNSS receiver 104, the server 102, the GNSS 100 as a whole, and functions, procedures, components and other details provided herein may be tailored for any GNSS, including, for example, the Global Positioning System ("GPS"), GALILEO, GLONASS, SBAS (Space Based Augmentation System), QZSS (Quazi-Zenith Satellite System), LAAS (Local Area Augmentation System) or some combination thereof.

The GNSS receiver 104 may be in communication with the server 102 via a communication link. This communication link may be formed, for example, by communicatively coupling one or more nodes of a network, such as a wireless communication system 106 (e.g., cellular telephone network) and/or other type of network 108, including a packet-data network, such as the Internet, a circuit-switched network, such as a PSTN, or a convergence of both.

For purposes of clarity, the system 100 is shown with only one GNSS receiver 104 and only one server 102. It is to be understood, however, that the system 100 may include and/or be deployed with a plurality of GNSS receivers and servers, and that each of these additional GNSS receivers and servers may communicate with the server 102 (and/or the additional servers) via respective communication links.

In the GNSS 100, a position of the GNSS receiver 102 may be determined, computed or otherwise formed as a function of the satellite signals received from the satellites 105. For example, the GNSS receiver 104 may acquire satellite signals broadcast by a one or more satellites in a constellation (shown collectively as the "satellites 105"), and may measure pseudoranges to one or more (and typically four) of the satellites 105 to locate its unknown position ("receiver position"). When configured for GPS, the GNSS receiver 104 may, for example, measure pseudoranges to a plurality of GPS satellites in the GPS constellation.

To assist in the acquisition of satellite signals, the computation of the receiver position, or both, the GNSS receiver 104 may receive from the server 102 assistance data, which is formed from, contains, derived from and/or is associated with or otherwise garnered from the satellite signals. The GNSS receiver 104, in turn, may (i) use the assistance, data, including one or more expected or predicted pseudoranges (hereinafter "predicted pseudoranges"), to assist in acquisition of the satellite signals; (ii) measure actual pseudoranges from the satellite signals ("measured pseudoranges"); and (iii) transmit the measured pseudoranges to the server 102 over the communication link, e.g., the wireless communication system 106.

The server 102 may use the measured pseudoranges to solve for the unknown position of the GLASS receiver 104 (i.e., the "receiver position"). The receiver position may be thereafter thereafter transmitted to the GNSS receiver 104 via the communication link, or made available to a third-party requester 199 via another manner, such as through the Internet.

As an alternative, the GNSS receiver 104 may use the measured pseudoranges to compute its own position (i.e., the receiver position) without transmitting the pseudoranges to the server 102. In this case, the GNSS receiver 104 uses the assistance data to assist in acquisition of the satellite signals and/or the computation of the receiver position.

To generate the assistance data, server 102 uses various broadcasted measurements and information associated with the constellation, including for example, broadcast ephemeris, code phase measurements, carrier phase measurements; Doppler measurements, and the like. As noted, broadcasted measurements and information may be obtained directly from the satellite signals and/or by decoding one or more satellite-navigation messages that are broadcast from the satellites 105.

Alternatively, the server 102 may have to obtain or receive the various broadcasted measurements and information from an external source. This external source may be any device that obtains and distributes the broadcasted measurements and information, and may be, for example, embodied as reference network 110; a satellite control station 112, such as a Master Control Station ("MCS") in GPS; or other source of such information, such as a data store, communicatively coupled to the Internet.

The reference network 110 may include a plurality of tracking stations; each of which may include a satellite-signal receiver (also known as a reference receiver). The plurality of tracking stations collect and distribute, in one form or another, the broadcasted measurements and information from all the satellites in the constellation. Alternatively, the reference network 110 may include a one or more tracking stations that collect and distribute, in one form or another, such measurements and information (i) from a subset of all the satellites in the constellation or (ii) for one or more particular regions of the world. Each of the aforementioned tracking stations is typically at a known location. Details of one or more examples of a system for distributing broadcasted measurements and information, such as the broadcast ephemeris, is described in U.S. Pat. No. 6,411,892, issued Jun. 25, 2002, which is incorporated by reference herein in its entirety. Included within such, details are one or more examples of a reference network and corresponding tracking stations.

The assistance information generated by the server 102 may include (i) acquisition-assistance information to assist in acquiring the satellite signals such as code phase measurements, carrier phase measurements; Doppler measurements, and the like; (ii) one or more types of the satellite-navigation data, including, for example, broadcast ephemeris and/or long-term orbit and clock models (collectively LTO information), and (iii) any other information that the may be used to acquire the satellite signals and/or determine the receiver position.

In addition, the satellite-navigation data may include one or more of the predicted pseudoranges and/or a model of such predicted pseudoranges ("pseudorange model"). Accordingly, the server 102 may obtain and distribute the predicted pseudoranges and/or the pseudorange model. Details of one or more examples of a system for distributing and using predicted pseudoranges and/or a pseudorange model to acquire satellite signals is described in U.S. Pat. No. 6,453,237, issued Sep. 17, 2002, which is incorporated by reference herein in its entirety.

When the assistance data includes broadcast ephemeris and/or LTO information, such as an LTO model, the server 102 and/or the external source may obtain the broadcast ephemeris from the satellites 105 (directly or indirectly), process the broadcast ephemeris (if at all), and distribute the broadcast ephemeris and/or LTO, information to the GNSS receiver 104. Details of one or more examples of systems and methods for obtaining, processing, distributing and/or using the broadcast ephemeris and LTO information, such as an LTO model, are described in co-pending U.S. patent application Ser. No. 11/333,787, filed Jan. 17, 2006; Ser. No. 09/993,335, filed Nov. 6, 2001; and U.S. Pat. Nos. 6,560,534 and 6,542,820, which as noted above, are incorporated herein by reference in their entirety.

As above, the assistance data (regardless of its type) is valid for its "validity period," which, may be a short, medium, or long amount or duration of time. The validity period for acquisition-assistance information is generally several minutes. The validity period for the broadcast ephemeris is a few (i.e., 2-4) hours. The validity period for the LTO information is any amount of time greater than the validity period for the broadcast ephemeris, and may be a few days, a week or more. The assistance data may also become invalid unexpectedly during its validity period. This typically occurs when a satellite orbit or satellite clock is adjusted during the validity period of the assistance data.

Regardless of the type, content and/or format of the assistance data, if (or when) the broadcasted measurements and information upon which a current version of the assistance data is based becomes invalid ("invalid assistance data"), then the GNSS receiver 104 might not be able to adequately, if at all, acquire the satellite signals and/or compute the receiver position using such current assistance data. If however, the GNSS receiver 104 is able to acquire the satellite signals and/or compute the receiver position using the invalid assistance data then accuracy of the receiver position is more likely than not to be severely degraded. To detect and potentially compensate for such situation, the server 102 and/or the GNSS receiver 104 may monitor and adjust for deficiencies in the integrity of the assistance data in use by the GNSS receiver 104 ("current assistance data").

As described in detail below, the server 102 may obtain the broadcasted measurements and information, and generate, using such broadcasted measurements and information, integrity data for use with the assistance data. Alternatively the GNSS receiver 104 may obtain from the server 102 (usually responsive to one or more requests from the GNSS receiver 104) more recent or "fresh" assistance data when the GNSS receiver 104 determines that the current assistance data lacks integrity or is no longer valid, as described below with respect to FIGS. 8, 10 and 11, for example. The GNSS receiver 104 may do so notwithstanding that the broadcasted measurements and information upon which the current assistance data is deemed valid.

Typically, the broadcasted measurements and information obtained by the server 102 is more up to date than the current assistance data. The integrity data produced by the server 102, in turn, may reflect this condition, and as such, may be transmitted to the GNSS receiver 104, accordingly.

Figure 2:
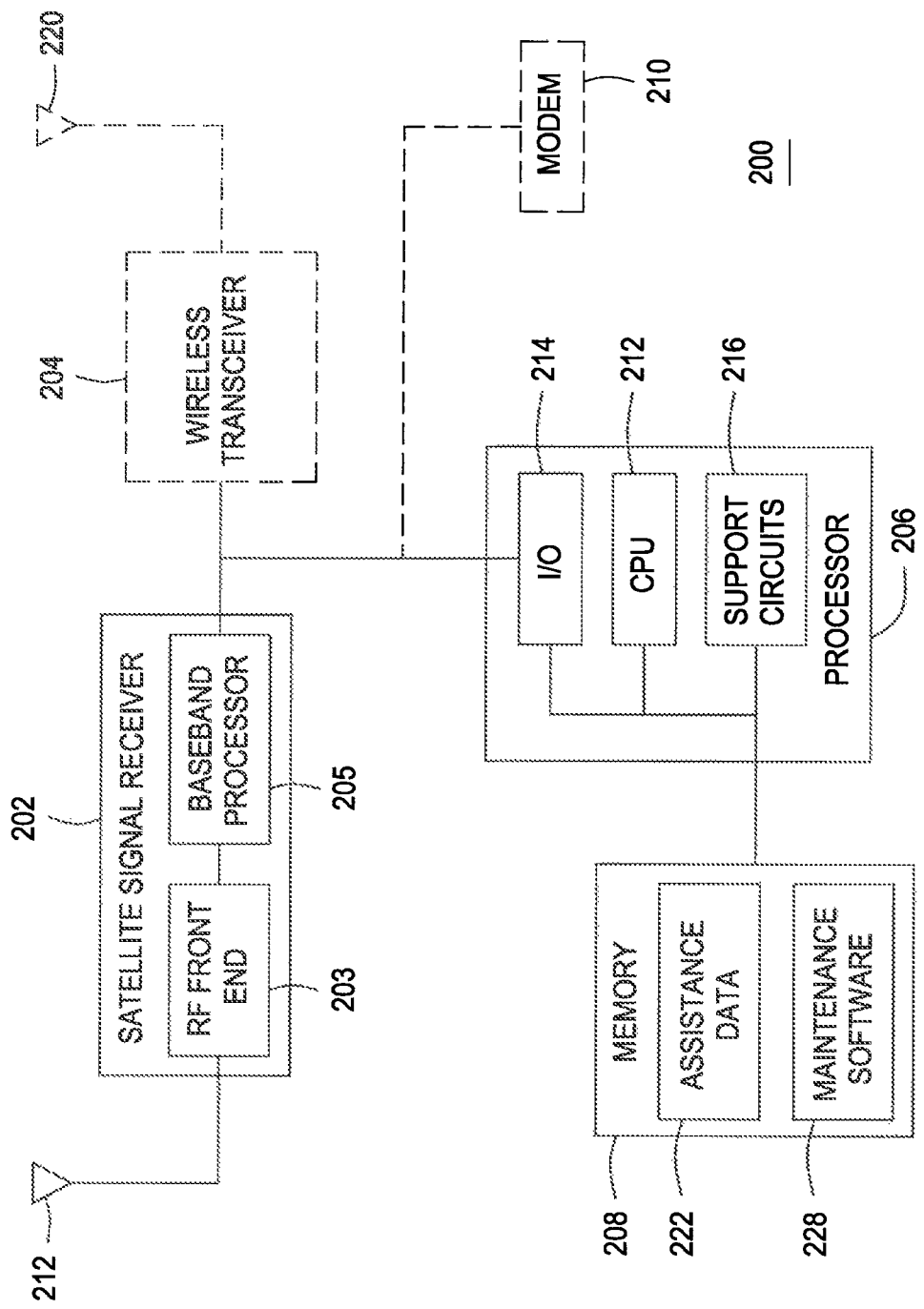
FIG. 2 is a block diagram depicting an example of a receiver for use with a Global-Navigation-Satellite System.

FIG. 2 is a block diagram depicting an example of a GNSS receiver 200 for a GNSS. The GNSS receiver 200 may be used as the GNSS receiver 104 shown in FIG. 1. The GNSS receiver 200 illustratively comprises a satellite signal receiver 202, a wireless transceiver 204, a processor 206, a memory 208, and optionally, a modem 210 (or other communication port or device). The combination of the satellite signal receiver 202, the wireless transceiver 204, and memory 208 may be contained within a mobile station, such as a cellular phone, pager, laptop computer, personal-digital assistant (PDA) and like type wireless device known in the art.

The satellite signal receiver 202 comprises circuitry to facilitate receiving and processing satellite signals in a well-known manner. Typically, the satellite signal receiver 202 comprises a radio frequency (RF) front end 203 coupled to a baseband processor 205. The satellite signal receiver 202 acquires the satellite signals via the RF front end 203 and uses the baseband processor 205 to generate pseudorange measurements (i.e., clock errors plus distances between the GNSS receiver 200 and the satellites 105). Any form of a positioning module is useful in this role. Examples of the satellite signal receiver 202 may be found in any of the GL20000, Hammerhead and Marlin available from Global Locate Inc. of San Jose, Calif., or the SiRFStarIII available from SiRF Technology Holdings Inc. of San Jose, Calif. An exemplary AGPS receiver that may be used with the invention is described in U.S. Pat. No. 6,453,237. The pseudoranges measurements may be coupled to the wireless transceiver 204 through the processor 206.

The processor 206 comprises a central processing unit ("CPU") 212, an input/output ("I/O") interface 214, support circuits 218, and at least one bus or serial communication link 216. The CPU 210 may, be one or more well-known processors or microprocessors. The support circuits 216 comprise well known circuits that facilitate operation of the CPU 212. The support circuits 216 may comprise at least one, of cache, power supplies, clock circuits, and the like.

The bus or serial communication link 218 provides for transmissions of digital information, including information relating to determining the receiver position, among the CPU 212, support circuits 216, memory 208, I/O interface 214, and other portions of the GNSS receiver 200 (not shown).

The I/O interface 214 provides an interface to control the transmissions of digital information to and from the GNSS receiver 200. The I/O interface 214 may interface with one or more I/O devices, such as the modem 210, a keyboard, touch screen, and/or other device.

The transceiver 204 may be used to communicate with the wireless communication system 106 and/or the other type of network 108. Using the transceiver 204, the GNSS receiver 200 may obtain from an external source, such as the server 102, assistance information to assist in acquiring and processing the satellite signals.

Examples of a combination of a satellite-signal receiver and a transceiver, and an assistance server are provided in commonly-assigned U.S. Pat. Nos. 6,411,892; 6,429,814; 6,587,789; 6,590,530; 6,703,972; 6,704,651; and 6,813,560; U.S. patent application Ser. No. 09/993,335, filed Nov. 6, 2001; Ser. No. 10/349,493, filed Jan. 22, 2003; Ser. No. 10/359,468, filed on Feb. 5, 2003; Ser. No. 10/692,292, filed Oct. 23, 2003; Ser. No. 10/719,890, filed Nov. 21, 2003; Ser. No. 10/926,792, filed Aug. 26, 2004; Ser. No. 10/884,424, filed on Jul. 1, 2004; Ser. No. 10/912,516, filed Aug. 5, 2004; Ser. No. 10/932,557, filed on Sep. 1, 2004; Ser. No. 10/968,345, filed on Oct. 19, 2004; Ser. No. 11/077,380, filed on Mar. 3, 2005; Ser. No. 11/206,615, filed on Aug. 18, 2005; Ser. No. 11/261,413, filed on Oct. 28, 2005; and U.S. Provisional Patent Application Ser. No. 60/760,140, filed on Jan. 19, 2006; all of which are incorporated herein by reference in their entirety.

The wireless transceiver 204 may transmit, using its antenna 220, the measured pseudoranges for computing the receiver position at a server, such as server 102. Alternatively the measured pseudoranges may be stored within the memory 208 and later used by the GNSS receiver 200 to compute the receiver position. For example, the GNSS receiver 200 may perform processing to compute the receiver position using the pseudoranges that are generated by the satellite signal receiver 202. That is, the GNSS receiver 200 may use its processor 206, which is capable of performing functions other than the computation of receiver position, to (i) load from the memory 208 (or obtain directly from the satellite signal receiver 202) the pseudoranges that are generated by the satellite signal receiver 202, and (ii) compute the receiver, position using these measured pseudoranges.

The memory 208 may be embodied as random access memory, read only memory, an erasable programmable read only memory and variations thereof, content addressable memory and variations thereof, flash memory, disk drive storage, removable storage, hard disc storage etc., and any combination thereof. The memory 208 may be loaded with and store the current assistance data 222, which can be used to assist in the acquisition of satellite signals or the computation of position or both. The current assistance, data 222 may be received from the server 102 via the communication link using the wireless transceiver 204 or via the other type computer network 108 (e.g., Internet) using the modem 210 (or other communication port or device that connects the device to, a computer network).

In addition, the memory 208 may be loaded with and store executable instructions or other code (e.g., software) for some or all of the process or function described herein. These executable instructions may include, for example, assistance-data-maintenance software 228 for performing some or all of the processes 800, 1000 and 100 illustrated in FIGS. 8, 10 and 11 (below).

Figure 3:
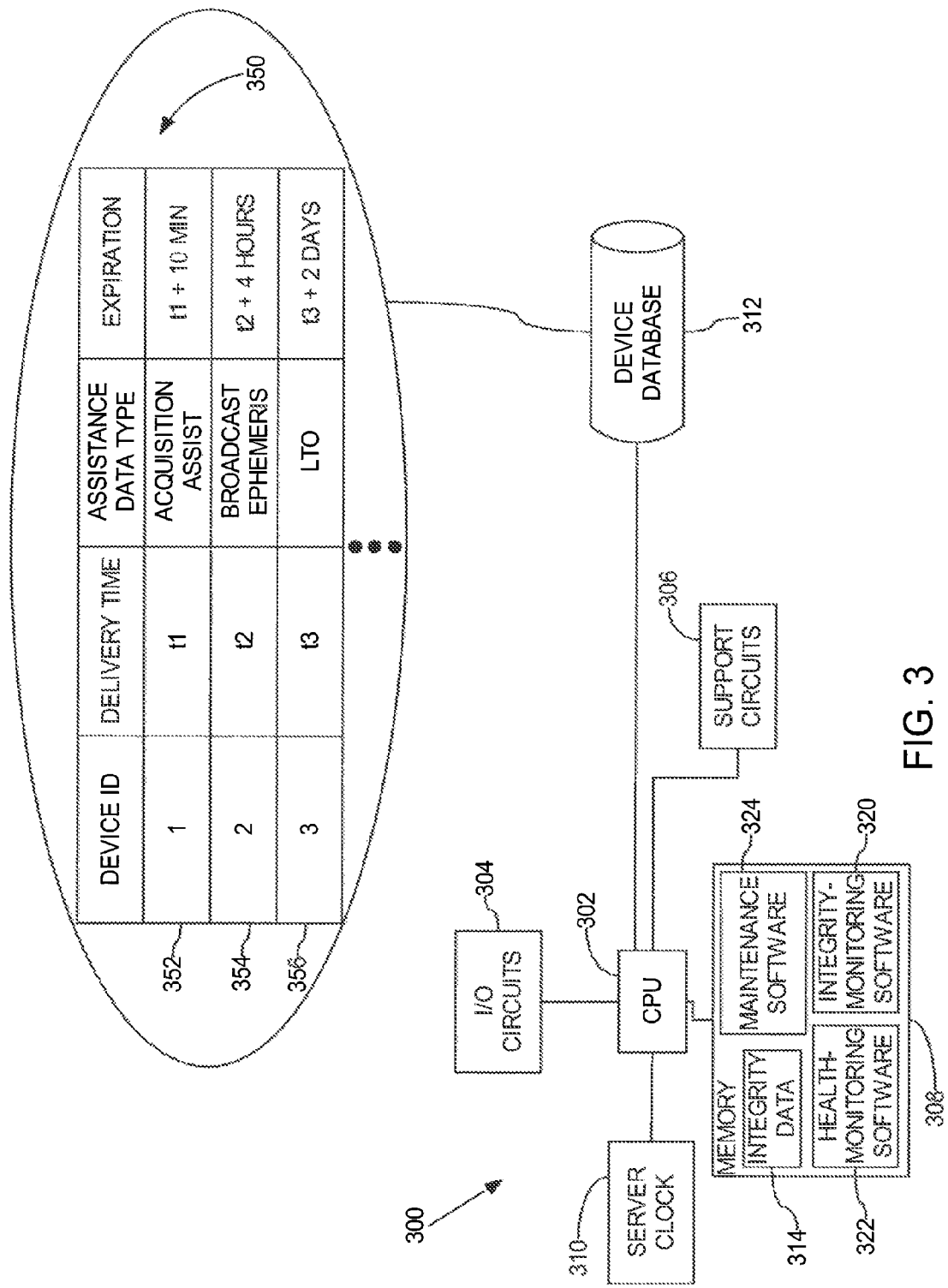
FIG. 3 is a block diagram depicting an example of a server for use with a Global-Navigation-Satellite System.

Referring, now to FIG. 3, a block diagram depicting an example of a server 300 for a GNSS is shown. The server 300 may be used as the server 102 shown in FIG. 1. The server 300 illustratively comprises a central processing unit (CPU) 302, input/output (I/O) circuits 304, support circuits 306, a memory 308, and a server clock 310.

The server 300 may include or be coupled to a device database 312. The support circuits 306 comprise well-known circuits that facilitate operation of the CPU 202, such as clock circuits, cache, power supplies, and the like. The server clock 310 may be used to provide a time tag to indicate the time-of-arrival of measured pseudoranges transmitted by a GNSS receiver, such as GNSS receiver 104 and/or 200.

The memory 308 may be embodied as random access memory, read only memory, an erasable programmable read only memory and variations thereof, content addressable memory and variations thereof, flash memory, disk drive storage, removable storage, hard disc storage etc., and any combination thereof. The memory 308 may be loaded with and store executable instructions or other code (e.g., software) for any process or function described herein. These executable instructions may include, for example, integrity-monitoring software 320 for performing process 400 illustrated in FIG. 4 (below), satellite-health-monitoring software 322 for performing any of the processes 500, 600, 700 and 900 illustrated in FIGS. 5, 6, 7 and 9 (below); assistance-data-maintenance software 324 for performing some or all of the process 800 illustrated in FIG. 8 (below).

The server 300 via its I/O circuits 304 may receive the broadcasted measurements and information (e.g., ephemeris, code phase measurements, carrier phase measurements, Doppler measurements, etc.) from the external source (e.g., reference network, satellite control station, Internet). The server 300 may use the broadcasted measurements and information to generate or compute the current assistance data and/or one or more previous or future versions of the assistance data.

To monitor the integrity of the current assistance data, the server 300 keeps track of the type of assistance data distributed to each of a plurality of remote receivers (not shown), a time of delivery of the current assistance data, and a time of expiration of the current assistance data. In one embodiment, this information may be stored in a table 350 within a device database 312. The table 350 may have entries (e.g., three are shown) defined by, for example, a remote device ID, the time-of-day that the current assistance data was delivered to each of the remote devices listed in the table, the type of assistance data delivered, and the expiration time of the aiding data.

For example, an entry 352 indicates that (i) acquisition assistance information was delivered, at time t1, to one of the remote devices having an ID of "1," and (ii) the acquisition assistance data is set to expire 10 minutes from time t1. An entry 354 indicates that (i) broadcast ephemeris was delivered, at time t2, to one of the remote devices having an ID of "2," and (ii) the broadcast ephemeris data is set to expire four hours from time t2. An entry 356 indicates that (i) LTO information was delivered, at time t3, to a device having an ID of "3," and (ii) the LTO information is set to expire two days from time t3.

The server 300 monitors the integrity of the current assistance data in use by the remote devices identified in the device database 312, and responsively, produces integrity data 314. The integrity data 314 may be stored in the memory 308 and transmitted to one or more remote devices, as described below.

Figure 4:
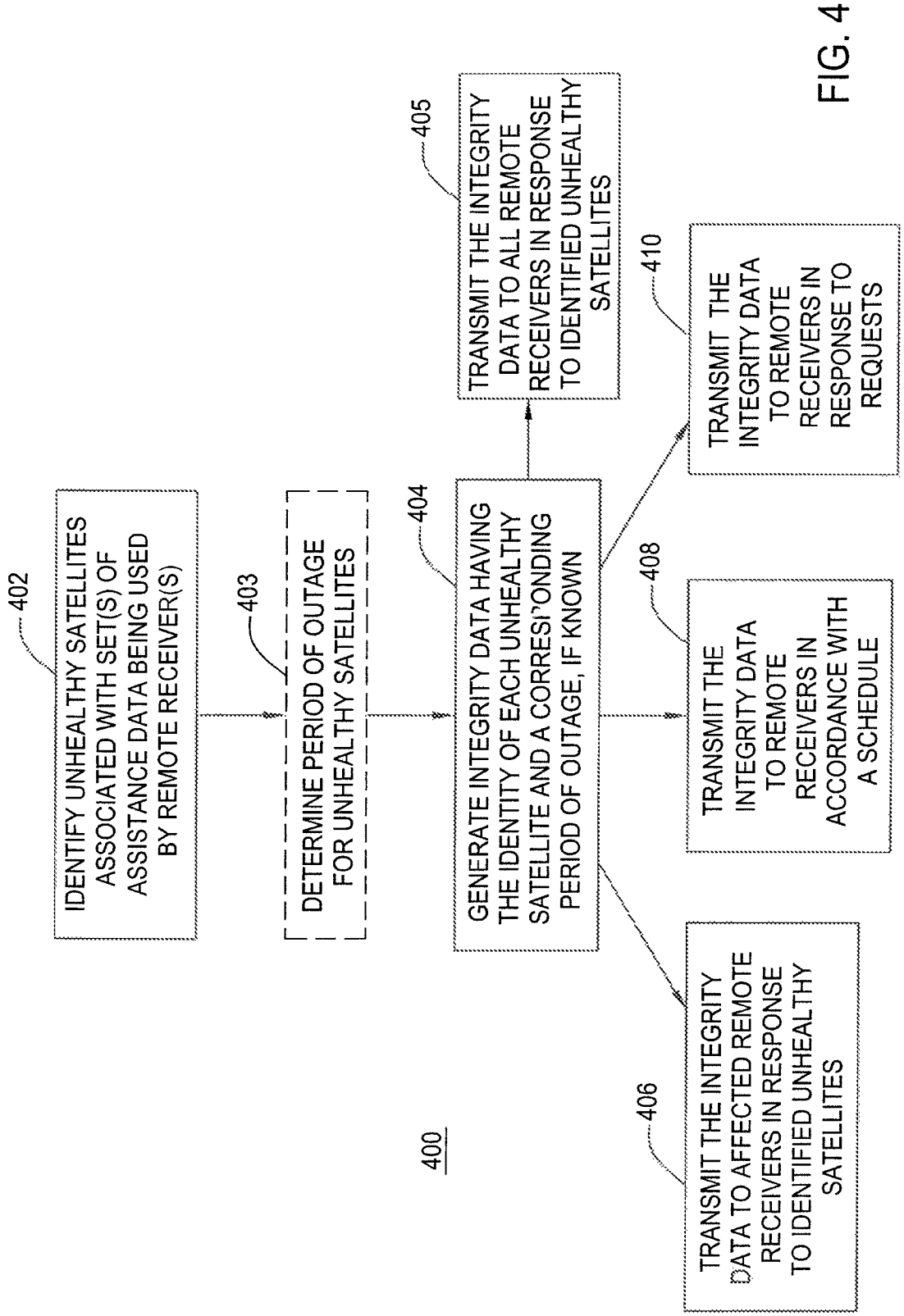
FIG. 4 is a flow diagram depicting an example of a process for monitoring the integrity of assistance data in use by one or more receivers of a Global-Navigation-Satellite System.

FIG. 4 is a flow diagram depicting an example of a process 400 for monitoring the integrity of current assistance data used by one or more GNSS receivers of a GNSS. The process 400 may be executed by a server of a GNSS, such as the server 300, to monitor the integrity of the current assistance data in use by the GNSS receivers.

The process 400 begins at step 402 where unhealthy satellites associated with current assistance data used by GNSS receivers are identified. As described by way of example, any of the example, processes 500, 600, 700, and 900 (below) may be used to identify unhealthy satellites.

At optional step 403, a period of outage is determined for each of the identified unhealthy satellites. For example, a period of outage for each of the identified unhealthy satellites may be obtained from outage notification data generated by a satellite control station, as discussed below with respect to the process 900 of FIG. 9.

At step 404, integrity data is generated. This integrity data includes an identity of each of the unhealthy satellites and a corresponding period of outage, if known. If outage periods are unknown, then the integrity data may include no period of outage or the period of outage may be set to a pre-defined value or to a value based on the particular type of aiding data in use.

For example, the period of outage may be set to any time between two to four hours when the current assistance data is based on or uses the broadcast ephemeris. Alternatively, the period of outage may be set to a time greater than such validity period when the current assistance data is based on or uses the LTO information.

The integrity data may then be transmitted to the GNSS receivers that are using the current assistance data. In one embodiment, at step 406, the integrity data may be transmitted to affected GNSS receivers in response to identified unhealthy satellites. That is, if any satellites were identified as being unhealthy, the integrity data is transmitted to the GNSS receivers having current assistance data that is affected by such unhealthy satellites. Thus, the integrity data is only sent when unhealthy satellites are identified and only sent to the GNSS receivers affected by such identified unhealthy satellites. In another embodiment, at step 405, the integrity data may be transmitted to some or all of the GNSS, receivers in response to unhealthy satellites being identified.

In another embodiment, at step 408, the integrity data is transmitted to GNSS receivers in accordance with a pre-defined transmission schedule. For example, the integrity data may be periodically broadcast to some or all of the GNSS receivers using the current assistance data; whether or not unhealthy satellites have been identified. In yet another embodiment, at step 410, the integrity data may be transmitted to one or more of the GNSS receivers in response to requests from such GNSS receivers.

Figure 5:
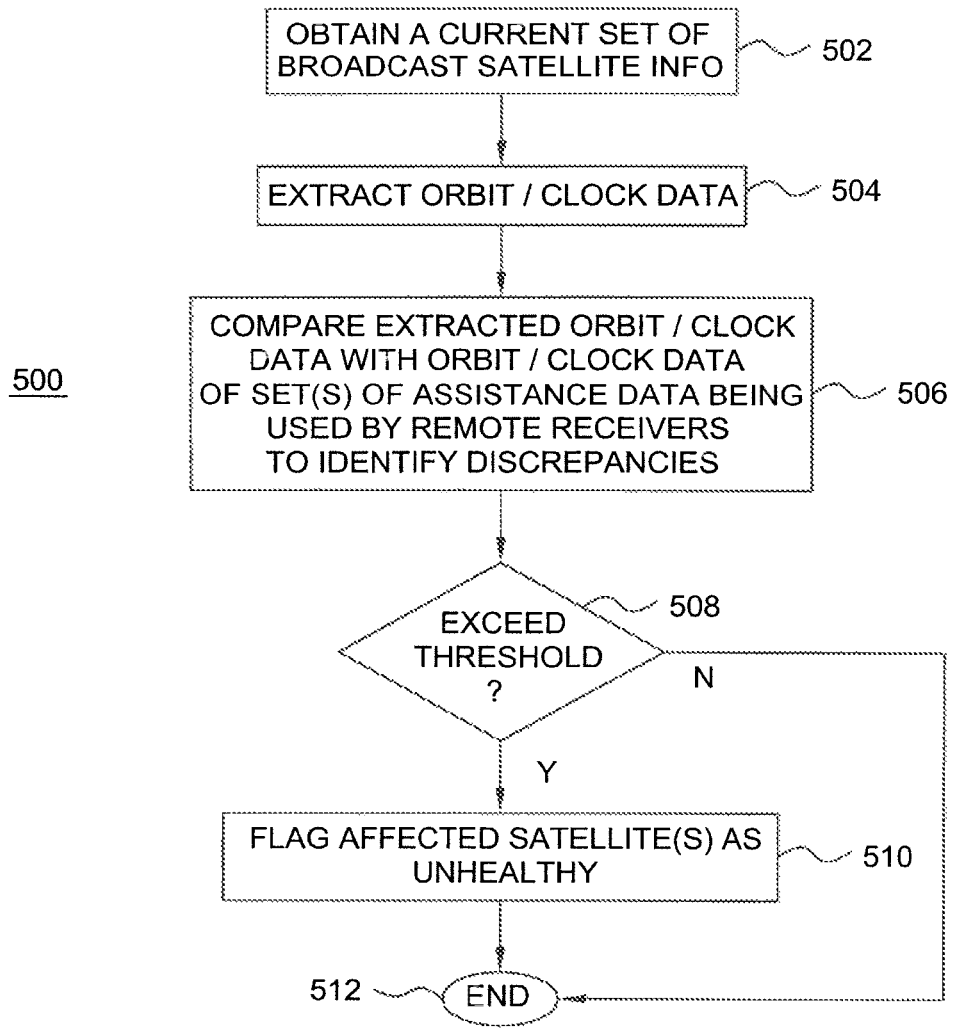
FIG. 5 is a flow diagram depicting an example of a process for identifying unhealthy satellites.

FIG. 5 is a flow diagram depicting an example of a process 500 for identifying unhealthy satellites. The process 500 begins at step 502, where a current set of the broadcasted measurements and information is obtained. This current set of measurements and information may be received over the communication link from a reference network, a satellite control station and/or other source of information.

At step 504, satellite orbit data, satellite clock data or both (hereinafter generally referred as "orbit/clock data") is exacted from the current set of the measurements and information. At step 506, the orbit/clock data is compared with orbit/clock data of one or more sets of the current assistance data being used by GNSS receivers so as to identify discrepancies. Such discrepancies may arise, for example, from a change in one or more of the satellites' orbits or a drift in one or more of the satellites' clocks since the time the current assistance data was generated. These discrepancies manifest may themselves as differences between the orbit/clock data extracted from the current set of the measurements and information and orbit/clock data underlying or otherwise part of the current assistance data.

At step 508, a determination is made as to whether any identified discrepancies exceed a pre-defined threshold. If, for example, one or more of the satellites' orbits change beyond a corresponding pre-defined threshold, and/or if one or more of the satellites' clocks drifted outside a corresponding pre-defined threshold, then the process 500 proceeds to step 510. Otherwise, the process 500 ends at step 512. At step 510, the affected satellites associated with the identified discrepancies are flagged as being unhealthy.

Figure 6:
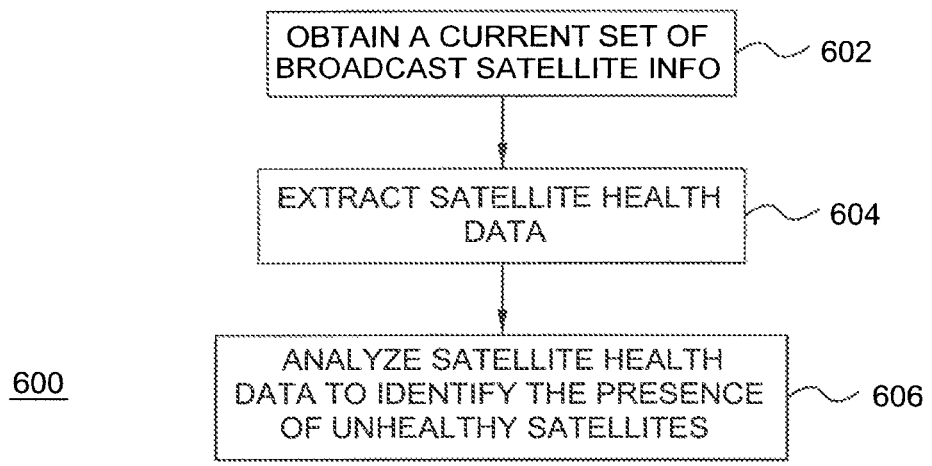
FIG. 6 is a flow diagram depicting another example of a process for identifying unhealthy satellites.

FIG. 6 is a flow diagram depicting another example of a process 600 for identifying unhealthy satellites. The process 600 begins at step 602, where a current set of the broadcasted measurements and information is obtained. This current set of measurements and information may be received over the communication link from a reference network, a satellite control station, and/or other source of information.

At step 604, satellite health data is extracted from the current set of measurements and information. As described, above, the broadcast ephemeris from each of the satellites contains precise satellite orbit and time model information for such satellite. In addition, the broadcast ephemeris may contain an indication of satellite health ("health status").

In GPS, for example, changes in ephemeris are announced by the MCS by changing the health status in the broadcast ephemeris. At step 606, the satellite health data is analyzed to identify the presence of unhealthy satellites.

Figure 7:
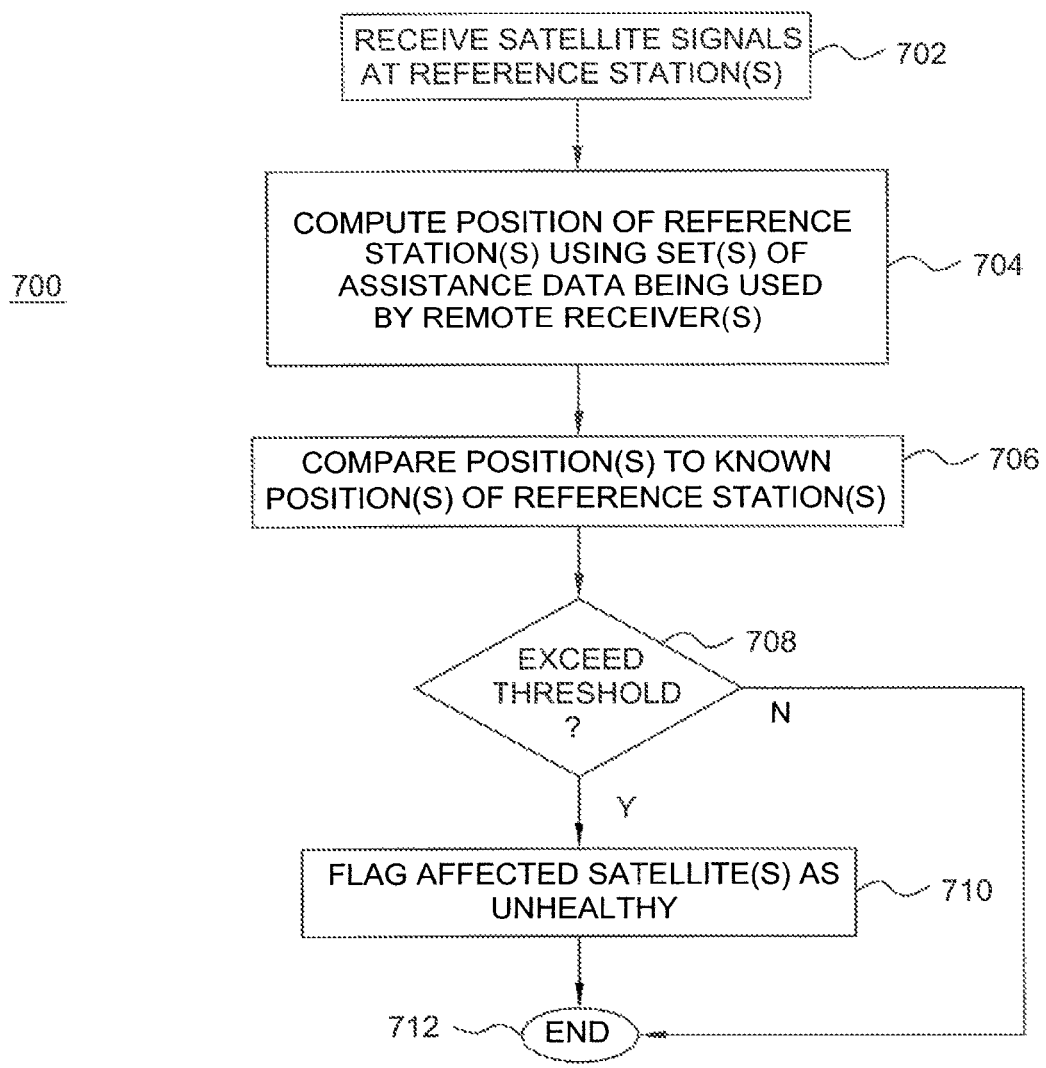
FIG. 7 is a flow diagram depicting yet another example of a process for identifying unhealthy satellites.

FIG. 7 is a flow diagram depicting yet another example of a process 700 for identifying unhealthy satellites. The process 700 begins at step 702, where satellite signals are received at one or more tracking stations having known positions.

At step 704, positions of each of the tracking stations are computed using one or more sets of current assistance data being used by the GNSS receivers. At step 706, these positions ("computed positions") are compared to the known positions of the tracking stations. If, for example, a given set of the current assistance data that is used to compute one or more of the computed positions of the tracking stations is invalid due to an unhealthy satellite, then these computed positions will be in error (and/or be identified as having discrepancies).

Thus, at step 708, a determination is made as to whether any or each of the computed positions exceeds the respective known positions by a pre-defined threshold. If so, the process 700 proceeds to step 710. Otherwise, the process 700 ends at step 712. At step 710, the affected satellites associated with the identified discrepancies are flagged as being unhealthy.

Figure 8:
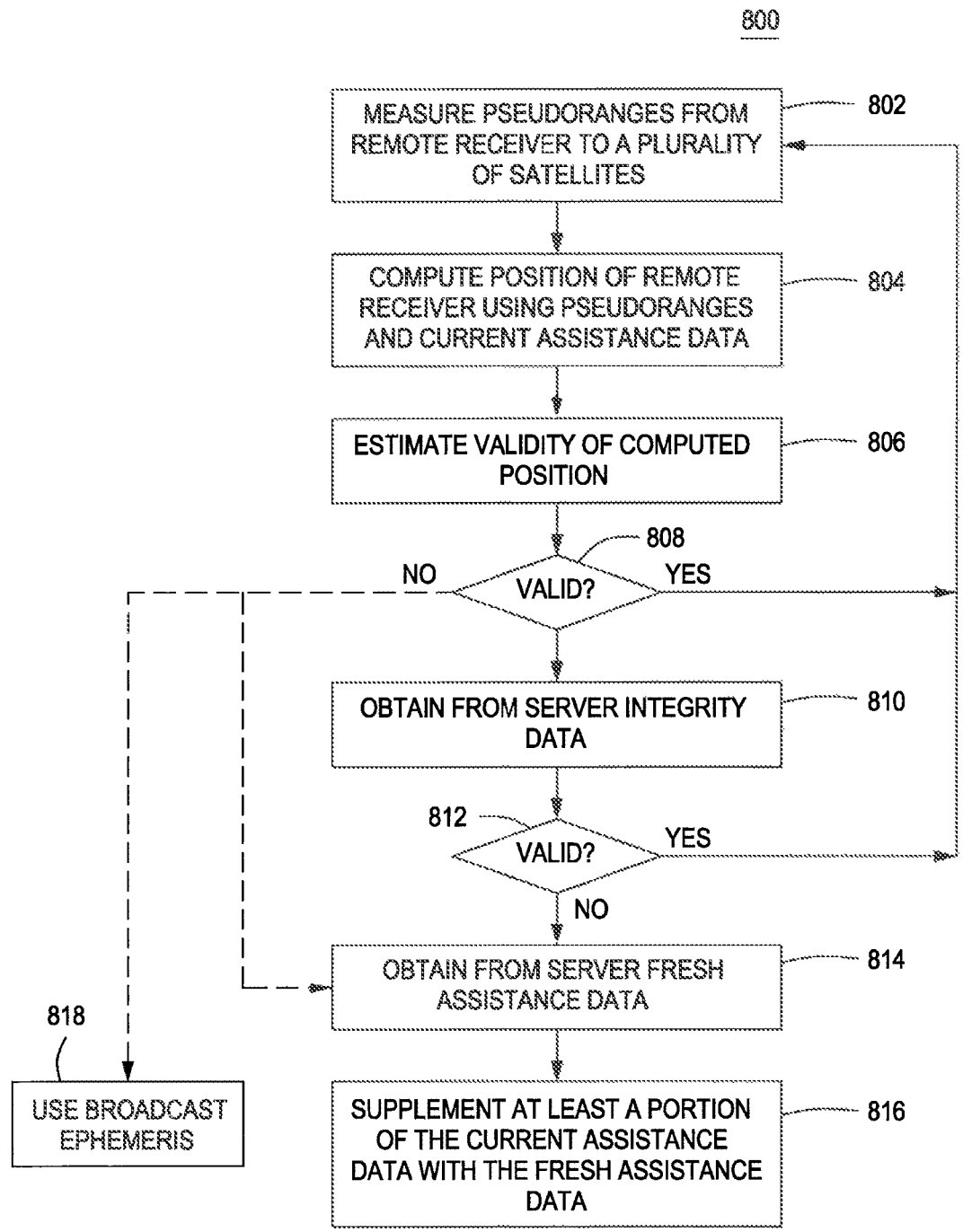
FIG. 8 is a flow diagram depicting an example of a process for obtaining from a server integrity data and/or fresh aiding data

FIG. 8 is a flow diagram depicting an example of a process 800 for obtaining (e.g., requesting and receiving) from a server integrity data and/or fresh assistance data. The process 800 begins at step 802, where measured pseudoranges are measured from between a GNSS receiver, such as the GNSS receiver 104 or 200, and one or more (and typically four) of a plurality of satellites, respectively.

At step 804, a computed position of the GNSS receiver is computed using the measured pseudoranges and the current assistance data. At step 806, a validity of the computed position is estimated.

The validity of the computed position may be estimated in any number of various ways. For example, the validity of the computed position may be estimated using a-posteriori residuals, which may be formed as a function of the measured pseudoranges. After formation, these a-posteriori residuals may be analyzed to identify, which, if any, of the measured pseudoranges are erroneous. If any of the measured pseudoranges are identified to be erroneous, then the validity of the computed position may be estimated as being invalid.

Other techniques may be used for estimating the validity of the computed position. For example, the validity of the computed position may be estimated a function of the computed position with an a-priori position. The a-priori position may be obtained, formed or otherwise garnered from the current assistance data (including any broadcast ephemeris and/or LTO information).

If, for example, a difference between the computed position and the a-priori position satisfies a particular threshold, then the validity may be estimated as invalid. Alternatively, if the difference does not satisfy the particular threshold, then the validity may be estimated as valid.

The particular threshold may be statically set to accommodate for or, alternatively, dynamically set to adjust for one or more of myriad of conditions, including, for example, an actual location of the GNSS receiver, a time since last obtaining the current assistance data, basis and/or type of the current assistance data (e.g., whether the current assistance data includes broadcast ephemeris and/or LTO information), etc.

The particular threshold may include one or more thresholds, and may be applied as one or more boundaries to the difference. The boundaries may function as one or more upper bounds one or more lower bounds or some combination thereof.

As another alternative the validity of the computed position may be estimated as a function of one or more a-priori pseudorange residuals. That is he computed position may be estimated as a function of a comparison between respective predicted and measured pseudoranges. The predicted pseudorange may be based on the a-priori position and time, and/or other satellite-tracking data. The a-priori position and time, and/or any other satellite-tracking data may be garnered from or be part of the current assistance data, including the LTO information, or alternatively, from the broadcast ephemeris garnered from the satellite signals.

Like above, when one or more of the a-priori pseudorange residuals satisfy respective thresholds, the validity may be estimated as invalid. Alternatively, when the a-priori pseudorange residuals do not satisfy respective particular thresholds, the validity may be estimated as valid.

Each of these respective thresholds may be statically set to accommodate for or, alternatively, dynamically set to adjust for one or more of a myriad of conditions, including, for example, an actual location of the GNSS receiver, a time since last obtaining the current assistance data, basis and/or type of the current assistance data (e.g., whether including broadcast ephemeris and/or LTO information), etc. Each of the particular thresholds may include one or more thresholds, and may be applied as boundaries to the a-priori pseudorange residuals. These boundaries may function as one or more upper bounds, one or more lower bounds or some combination thereof.

Other examples for estimating the validity of the computed position may use variations and/or combinations of the foregoing, including, for example, comparing computed and predicted altitudes, times, etc.

At step 808, a determination is made as to whether the computed position is valid. This determination may be made as a function of estimating the validity of the computed position, as described above. If the computed position is valid, then the process 800 may return to step 802, at which point the process 800 may be repeated. Otherwise, at least a portion of the current assistance data may be marked to prevent use, removed, deleted or otherwise excluded from the current assistance data ("excluded assistance data") and then the process 800 proceeds to (i) step 810 or, as alternatives, to (ii) step 814 or (iii) step 818. The excluded assistance data may be, for example, the current assistance data associated with satellite or satellites from which the measured pseudorange is determined.

At step 810, the GNSS receiver obtains from the server, usually in response to one or more requests thereto, the integrity data. After receipt, the GNSS receiver may use the integrity data to determine whether the current assistance data possessed thereby is still valid, as shown in step 812. If the current assistance data is not valid, then the GNSS receiver may use the integrity data to update or otherwise supplement the current assistance data (including, for example, replacing or otherwise modifying the excluded assistance data). Alternatively, the GNSS receiver may transition to step 814 to obtain fresh assistance data. If, on the other hand, the current assistance data is valid, then the process 800 transitions to step 802, at which point the process 800 may be repeated.

At step 814, the GNSS receiver obtains from the server, usually in response to one or more requests thereto, the fresh assistance data. This fresh assistance data may be formed from and include acquisition-assistance information ("fresh-acquisition-assistance information") and/or satellite-navigation data ("fresh-satellite-navigation data") that is more recent than the acquisition-assistance information and/or the satellite-navigation data of the current assistance data.

The fresh-acquisition-assistance information, in turn, may include information for acquiring the satellites, which may include at least one of code phase measurements, carrier phase measurements; Doppler measurements, and the like that are garnered from one or more satellite navigation messages broadcast from at least one of the satellites in the constellation. The fresh-satellite-navigation data may include broadcast ephemeris, one or more of the predicted pseudoranges, a pseudorange model, LTO information etc. that are more recent than such parameters of the current assistance data.

After obtaining the fresh assistance data, the GNSS receiver may use some or all of the fresh assistance data to update or otherwise supplement the current assistance data (including, for example, replacing or otherwise modifying the excluded assistance data), as shown in step 816. For example, the GNSS receiver may replace one or more of the predicted pseudoranges of the current assistance data with respective predicted pseudoranges of the fresh assistance data.

If, for instance, the current assistance, data is formed from the LTO information, such as the LTO model, then the GNSS receiver may replace one or more of the predicted pseudoranges of the current assistance data with respective predicted pseudoranges of the fresh assistance data, which may be also formed from LTO information, such as an LTO model.

Alternatively, the GNSS receiver may replace all of the current assistance data with some or all of the fresh assistance data. If, like above, the current assistance data is formed from LTO information, then the GNSS receiver may replace all of the current assistance data with some or all the fresh assistance data, which may also be formed from LTO information. The GNSS receiver may replace all of the current assistance data as such notwithstanding that only, a portion of, e.g., only one of the predicted pseudoranges, is estimated (step 808) or determined (step 812) invalid.

As noted above with respect to step 808, process 800 may transition from step 808 to step 818 as an alternative. At step 818, the GNSS receiver may, decode and then use broadcast ephemeris obtained directly from the satellite-navigation messages contained within satellite signals received at the GNSS receiver to update or otherwise supplement the current assistance data (including, for example, replacing or otherwise modifying the excluded assistance data). The GNSS receiver may appropriately do so when (i) attenuation of the satellite signals allows for successful decoding of the broadcast ephemeris, and/or (ii) the GNSS receiver is unable to obtain the integrity data and/or fresh assistance data from the server. With respect to the latter, the GNSS receiver may not be able to obtain the integrity data and/or fresh assistance data because, for example, it lacks, cannot maintain or looses connectivity with the server.

After updating or supplementing the current assistance data with the fresh assistance data, the process 800 may transition to step 802, at which point the process 800 may be repeated. The process 800 may be repeated periodically, in continuous fashion, or upon being triggered as a result a condition, such as detecting an error in the receiver position or a satellite position. The 800 may be repeated for other reasons as well.

In addition, the GNSS receiver may obtain the integrity data and/or the fresh assistance data without making a request for such data. For example, the integrity data and/or the fresh assistance data may be obtained from messages broadcasted from the server.

Additionally, the process 800 may transition to step 814 from step 812. This may occur when the a current set of the broadcasted measurements and information and the current assistance data are both based on common information, yet between the time of computing the receiver position and obtaining the current assistance data, the actual positions of the satellites changed. While such changes may be reflected in the fresh-acquisition-assistance information and/or fresh-satellite-navigation data at the server, the integrity data sent to or at the GNSS receiver may not yet reflect such change.

Moreover, the integrity data may not yet reflect the changes or the time for triggering replacement may not be reached because the current assistance data is formed from LTO information, such as an LTO model. For instance, the server may not check and/or compute the integrity data for the current assistance data because its validity period has not expired or is not close to expiring. Other possibilities for this are likely as well.

Figure 9:
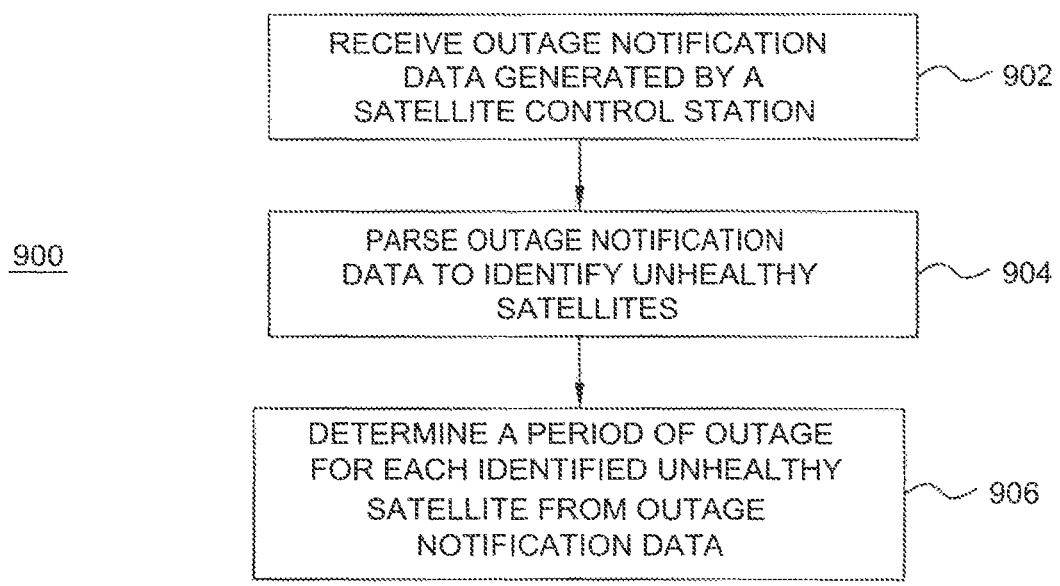
FIG. 9 is a flow diagram depicting another example of a process for identifying unhealthy satellites.

FIG. 9 is a flow diagram depicting another example of a process 900 for identifying unhealthy satellites in accordance with the invention. The process 900 begins at step 902, where outage notification data generated by a satellite control station is received. For example, the outage notification data may be received directly from the satellite control station, or via some other source, such as over the Internet. For example, in GPS, the satellite constellation is monitored by stations around the world under control of a master Control Station (MCS). The MCS announces satellite outages that are either planned for the future, or unplanned and immediate, by providing Notice Advisories to Navstar Users (NANUs) via the Internet.

At step 904, the outage notification data is parsed to identify unhealthy satellites. At step 906, a period of outage for each identified unhealthy satellite is determined. For example, a period of outage for an identified unhealthy satellite may be obtained from NANUs. By using outage notification data, the invention ensures that current assistance data in use by GNSS receivers always reflects the most current integrity status of the GPS constellation, regardless of whether the changes in integrity were planned for the future, or unplanned and immediate.

Figure 10:
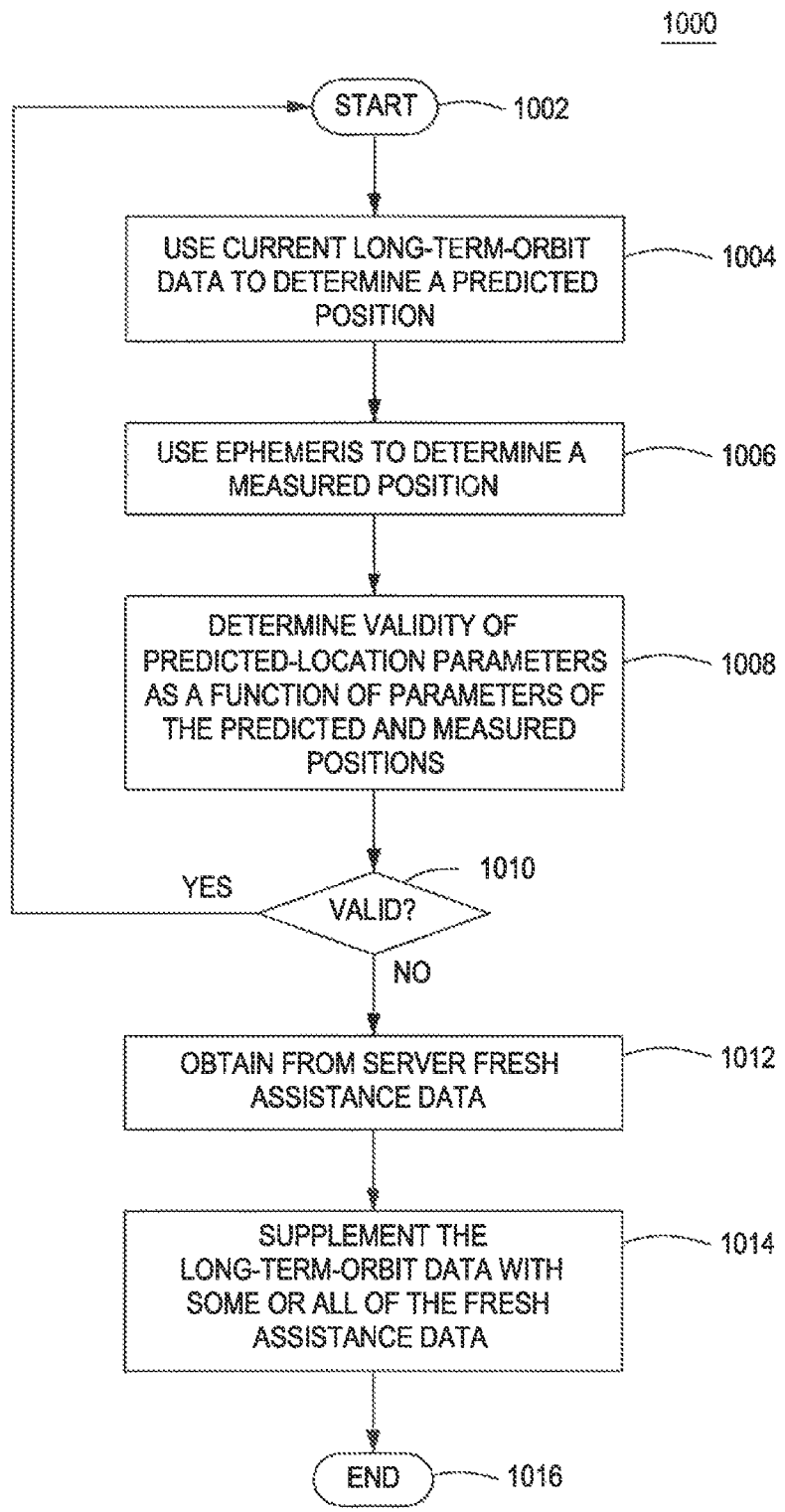
FIG. 10 is a flow diagram illustrating an example of a process for obtaining and using fresh aiding data.

FIG. 10 is a flow diagram illustrating an example of a process 1000 for obtaining and using fresh assistance data. For convenience, the process 1000 is described herein with respect to the architecture shown in FIGS. 1 and 2.

The process 1000 begins at termination block 1002, after the GNSS receiver 104 (i) obtains from the server 102 the current assistance data, which includes LTO information, such as an LTO model, and (ii) acquires the satellite signals from one or more (and typically four) of a plurality of satellites. For convenience, the current assistance data is referred to as "current LTO information" with respect to process 1000.

After termination block 1002, the process 1000 transitions to process block 1004. At process block 1004, the current LTO information is used to determine a predicted position of the GNSS receiver 104 ("predicted-position fix"). The predicted-position fix may be determined, for example, by the GNSS receiver 104 and/or the server 102. The GNSS receiver 104 and/or server 102 may do so, for instance, by applying the current LTO information and measured pseudoranges to a first recursive or other type filter, and detecting the predicted-position fix from an output of the first filter. The predicted-position fix may include one or more respective location parameters, including, for example, latitude, longitude, altitude and/or a common-mode error.

To facilitate determining the predicted-position fix at the server 102, the server 102 may obtain the measured pseudoranges and current LTO information from the GNSS receiver 104. Alternatively, the server 102 may determine the predicted-position fix using the measured pseudoranges obtained from the GNSS receiver 104 and the current LTO information known by the server 102 to be in use by the GNSS receiver 104. After process block 1004, the process 1000 transitions to process block 1006.

At process block 1006, broadcast ephemeris obtained from satellites signals is used to determine a measured position of the GNSS receiver 104 ("measured-position fix"). The measured-position fix may be determined by the GNSS receiver 104 and/or one or more of the tracking stations of the reference network 110. The GNSS receiver 104 and/or the tracking, stations may do so, for instance, by applying the broadcast ephemeris obtained from signals of the satellites (garnered directly from the satellites or indirectly from the server 102) and measured pseudoranges to a second recursive or other type filter, and detecting the measured-position fix from an output of the second filter. The measured-position fix, like the first position fix, may include one or more respective location parameters, including, for example, latitude, longitude, altitude and/or a common-mode error. After process block 1006, the process 1000 transitions to process block 1008.

At process block 1008, validity of at least one of the predicted location parameters is determined as a function of such predicted location parameter ("first-location parameter") and a respective one of the measured location parameters ("second-location parameter"). The validity may be determined, for example, by the GNSS, receiver 104 and/or the server 102. The GNSS receiver 104 and/or server 102 may do so, for instance, by forming a difference between the first and second location parameters, and then determining if the difference satisfies a given threshold. If, for example, the difference satisfies the given threshold, then the validity of the first-location parameter may be deemed valid, otherwise, the validity of the first-location parameter may be deemed invalid.

The given threshold may be statically set to accommodate for or, alternatively, dynamically set to adjust for one or more of myriad of conditions, including, for example, an actual location of the GNSS receiver 104, a time since last obtaining the current LTO information, basis and/or type of the current LTO information, etc. The particular threshold may include one or more thresholds, and may be applied as boundaries to the difference. These boundaries may function as one or more upper bounds, one or more lower bounds or some combination thereof.

The same functions may be performed for one or more of the remaining predicted location parameters, as desired. Alternatively, the same functions may be performed for each of the remaining predicted location parameters unless one of them is deemed invalid.

To facilitate determining the validity at the server 102, the server 102 may have to obtain the predicted-position fix from the GNSS receiver 104. Using the predicted-position fix, the server 102 can obtain the first-location parameter. Similarly, the server 102 may have to obtain the measured-position fix from the GNSS receiver 104 or the tracking stations, depending of course, on which determined the measured-position fix. Using the measured-position fix, the server 102 can obtain the second-location parameter.

To facilitate determining the validity at the GNSS receiver 104, the GNSS receiver 104 may have to obtain the predicted-position fix from the server 102. Using the predicted-position fix, the GNSS receiver 104 can obtain the first-location parameter. As shown in decision block 1010, if the GNSS receiver 104 and/or the server 102 determine that the predicted location parameters are valid, then the process returns to termination block 1002 to repeat the process 1000 as desired.

If, on the other hand, any of the predicted location parameters are deemed invalid, then the GNSS receiver 104 may exclude (e.g., mark to prevent use, remove, delete, etc.) at least a portion of the current LTO information from the current LTO information ("excluded LTO information"). The excluded LTO information may be, for example, the current LTO information associated with satellite or satellites from which the measured pseudoranges are determined.

In addition, the GNSS receiver 104 may obtain fresh assistance data or "fresh LTO information" from the server 102, as shown in process block 1012. The GNSS receiver 104 may obtain the fresh LTO information from the server 102 with or without a request from the GNSS receiver 104 for such fresh LTO information.

After obtaining the fresh LTO information, the GNSS receiver 104 may update or otherwise supplement, as noted above with respect to FIG. 8, some or all of the current LTO information with the fresh LTO information, as shown in process block 1014. This may include replacing one or more of the predicted location parameters. As above, the GNSS receiver 104 may update or otherwise supplement some or all of the current LTO information with the fresh LTO information notwithstanding that some or all of the current LTO information (and location parameters thereof) is estimated or determined invalid.

After process block 1014, the process 1000 transitions to termination at which point the process 1000 ends. Alternatively, the process 1000 may be repeated periodically, in continuous fashion, or upon being triggered as a result of a condition, such as an error in receiver or satellite position.

Figure 11:
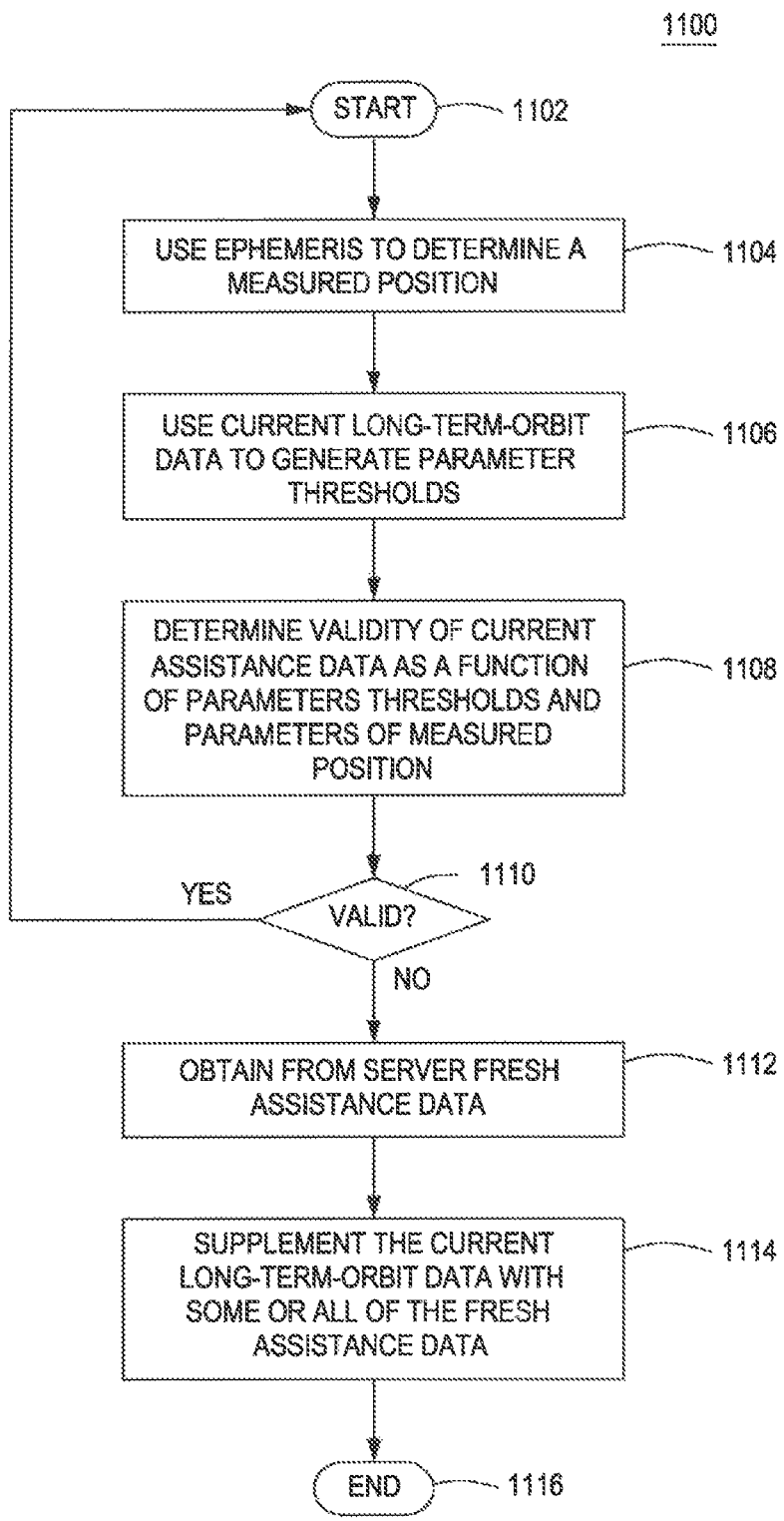
FIG. 11 is a flow diagram illustrating another example of a process for obtaining and using fresh aiding data.

FIG. 11 is a flow diagram illustrating an example of a process 1100 for obtaining and using fresh assistance data. For convenience, the process 1100 is described herein with respect to the architecture shown in FIGS. 1 and 2.

The process 1100 begins at termination block 1102, after the GNSS receiver 104 (i) obtains from the server 102 the current assistance data, which includes LTO information, such as an LTO model, and (ii) acquires the satellite signals from one or more (and typically four) of a plurality of satellites. For convenience, the current assistance data is referred to as "current LTO information" with respect to process 1100.

After termination block 1102, the process 1100 transitions to process block 1104. At process block 1104, broadcast ephemeris obtained from satellites signals is used to determine a measured position of the GNSS receiver 104 ("measured-position fix"). The measured-position fix may be determined, for example, by the GNSS receiver 104 and/or one or more of the tracking stations of the reference network 110. The GNSS receiver 104 and/or the tracking stations may do so, for instance, by applying the broadcast ephemeris (garnered directly from the satellites or indirectly from the server 102) and measured pseudoranges to a second recursive or other type filter, and detecting the measured-position fix from an output of the second filter. The measured-position fix may include one or more respective location parameters, including, for example, latitude, longitude, altitude and/or a common-mode error.

At process block 1106, the current LTO information is used to generate, for each of the location parameters, a respective parameter threshold. These parameter thresholds may be generated, for example, by the GNSS receiver 104 and/or the server 102. To facilitate generating the parameter thresholds, the GNSS receiver 104 and the server 102 may have to obtain the measured-position fix from the other.

The parameter thresholds may be statically set to accommodate for or, alternatively, dynamically set to adjust for one or more of myriad of conditions, including, for example, an actual location of the GNSS receiver 104, a time since last obtaining the current LTO information, basis and/or type of the current LTO information, etc. Each of the parameter thresholds may include one or more thresholds, and may be applied as boundaries to the location parameters. The boundaries may function as one or more upper bounds, one or more lower bounds or some combination thereof.

After process block 1106, the process 1100 transitions to process block 1108. At process block 1108, validity of the current assistance data as a function, of at least one of the parameter thresholds and a respective one of the measured location parameters is, determined. The validity of the current assistance data may be determined, for example, by the GNSS receiver 104 and/or the server 102. The GNSS receiver 104 and/or the server 102 may do so, for instance, by determining if such measured location parameter satisfies its respective parameter threshold. If the measured location parameter satisfies its respective parameter threshold, then the validity of the measured location parameter may be deemed valid. Otherwise, the validity of the measured location parameter may be deemed invalid.

The process block 1108 may be performed for one or more of the remaining measured location parameters, as desired. Alternatively, the same functions may be performed for each of the remaining measured location parameters unless one of them is deemed invalid. To facilitate determining the validity of the current LTO information, the GNSS receiver 104 and the server 102 may have to obtain from the other the respective parameter thresholds and measured location parameters, depending of course, on which maintains such parameter thresholds and measured location parameters.

As shown in decision block 1110, if the GNSS receiver 104 determines that the measured location parameters are valid, then the process returns to termination block 1102 to repeat the process 1100 as desired. If, on the other hand, any of the predicted location parameters are deemed invalid, then the GNSS receiver 104 may exclude (e.g., mark to prevent use, remove, delete, etc.) at least a portion of the current LTO information from the current LTO information ("excluded LTO information"). The excluded LTO information may be, for example, the current LTO information associated with satellite or satellites from which the measured pseudoranges are determined.

In addition, the GNSS receiver 104 may obtain from the server 102 fresh assistance data or "fresh LTO information", as shown in process block 1112. The GNSS receiver 104 may obtain the fresh LTO information from the server 102 with or without a request from the GNSS receiver 104.

After obtaining the fresh LTO information, the GNSS receiver 104 may update or otherwise supplement, as noted above with respect to FIG. 8, some or all of the current LTO information with the fresh LTO information, as shown in process block 1114. This may include replacing one or more of the predicted location parameters. As above, the GNSS receiver 104 may update or otherwise supplement some or all of the current LTO information with the fresh LTO information notwithstanding that some or all of the current LTO information (and location parameters thereof) is determined invalid.

After process block 1114, the process 1100 transitions to termination block 1116, at which point the process 1100 ends. Alternatively, the process 1100 may be repeated periodically, in continuous fashion, or upon being triggered as a result of a condition, such as an error in receiver or satellite position.

Although the foregoing has been described with reference to GPS satellites, it will be appreciated that the teachings are equally applicable to positioning Systems that utilize pseudolites or a combination of satellites and pseudolites. Pseudolites are ground-based transmitters that broadcast a PN code (similar to the GPS signal) that may be modulated on an L-band carrier signal, generally synchronized with GPS time. The term "satellite", as used herein, is intended to include pseudolites or equivalents of pseudolites, and the term "GPS signals", as used herein, is intended to include GPS-like signals from pseudolites or equivalents of pseudolites.

Moreover, in the preceding discussion, the invention has been described with reference to application upon the United States Global Positioning System (GPS). It should be evident, however, that these methods are equally applicable to similar satellite systems, and in particular, the Russian Glonass system and the European Galileo system. The term "GPS" used herein includes such alternative Global-Navigation-Satellite Systems (GNSS), including the Russian Glonass system and the European Galileo system.

While the foregoing is directed to illustrative embodiments of the present invention, other and further embodiments of the invention may be devised without departing from the basic scope thereof, and the scope thereof is determined by the claims that follow.

The invention claimed is:

1. A method, comprising;
obtaining, for a first receiver, a predicted position-fix generated using current long-term-orbit information and using measured pseudoranges between four satellites and the first receiver, wherein the current long-term-orbit information is valid longer in time than first broadcast ephemeris from the four satellites;
obtaining, for the first receiver, a measured position-fix generated using second broadcast ephemeris from the four satellites and using the measured pseudoranges between the four satellites and the first receiver;
determining, by a processor, a validity of the predicted position-fix based on a difference between the predicted position-fix and the measured position-fix; and
requesting and obtaining fresh long-term-orbit information from a server based on the determination indicating a lack of validity of the predicted position-fix.

2. The method of claim 1, further comprising:
discarding the current long-term-orbit information based on the determination indicating a lack of validity of the predicted position-fix.

3. The method of claim 1, wherein determining the validity of the predicted position-fix comprises:
comparing the difference between the predicted position-fix and the measured position-fix to a threshold.

4. The method of claim 3, further comprising:
excluding at least a portion of the current long-term-orbit information when the difference satisfies the threshold.

5. The method of claim 1, further comprising:
supplementing the current long-term-orbit information based on the determination indicating the lack of validity of the predicted position-fix.

6. The method of claim 1, wherein the current long-term-orbit information is supplemented with the fresh long-term-orbit information.

7. The method of claim 5, wherein determining the validity of the predicted position-fix comprises:
comparing the difference between the predicted position-fix and the measured position-fix to a threshold.

8. The method of claim 3, further comprising:
dynamically setting the threshold.

9. The method of claim 5, wherein the fresh long-term-orbit is more current than the current long-term-orbit information.

10. The method of claim 1, wherein the long-term-orbit information has a validity period greater than the second broadcast ephemeris.

11. A receiver comprising:
a memory configured to store executable instructions;
a processor configured to obtain from the memory the executable instructions and execute the executable instructions to:
obtain a predicted position-fix generated using current long-term-orbit information and using measured pseudoranges between four satellites and the receiver, wherein the current long-term-orbit information is valid longer in time than first broadcast ephemeris from the four satellites;
obtain a measured position-fix generated using second broadcast ephemeris from the four satellites and using the measured pseudoranges between the four satellites and the receiver;
determine a validity of the predicted position-fix based on a difference between the predicted position-fix and the measured position-fix; and
request and obtain fresh long-term-orbit information from a server based on the determination indicating a lack of validity of the predicted position-fix.

12. The receiver of claim 11, wherein the processor is further configured to execute the executable instructions to:
discard the current long-term-orbit information based on the determination indicating the lack of validity of the predicted position-fix.

13. The receiver of claim 11, wherein the processor is further configured to execute the executable instructions to:
supplement the current long-term-orbit information based on the determination indicating the lack of validity of the predicted position-fix.

14. The receiver of claim 11, wherein the current long-term-orbit information is supplemented with the fresh long-term-orbit information.

15. The receiver of claim 11, wherein the processor is configured to determine the validity of the predicted position-fix by comparing the difference between the predicted position-fix and the measured position-fix to a threshold.

16. The receiver of claim 11, further comprising:
a transceiver for sending the request for the fresh long-term-orbit information and for receiving, in response to the request, the fresh long-term-orbit information.

17. A method, comprising:
determining a predicted position-fix generated using current long-term-orbit information and using measured pseudoranges between four satellites and a first receiver, wherein the current long-term-orbit information is valid longer in time than first broadcast ephemeris from the four satellites;
determining a measured position-fix generated using second broadcast ephemeris from the four satellites and using the measured pseudoranges between the four satellites and the first receiver;
determining, by a processor, a validity of the predicted position-fix based on a difference between the predicted position-fix and the measured position-fix; and
requesting and obtaining fresh long-term-orbit information from a server based on the determination indicating a lack of validity of the predicted position-fix.

18. The method of claim 17, further comprising:
discarding the current long-term-orbit information based on the determination indicating the lack of validity of the predicted position fix.

19. The method of claim 17, wherein determining the validity of the predicted position-fix comprises:
comparing the difference between the predicted position-fix and the measured position-fix to a threshold.

20. The method of claim 19, further comprising:
excluding at least a portion of the current long-term-orbit information when the difference satisfies the threshold.

* * * * *

UNITED STATES PATENT AND TRADEMARK OFFICE
CERTIFICATE OF CORRECTION

| | |
|---|---|
| PATENT NO. | : 8,963,773 B2 |
| APPLICATION NO. | : 13/924069 |
| DATED | : February 24, 2015 |
| INVENTOR(S) | : Van Diggelen et al. |

It is certified that error appears in the above-identified patent and that said Letters Patent is hereby corrected as shown below:

In the Claims

Column 18, line 55, please replace "indicating a lack of" with --indicating the lack of--.

Signed and Sealed this
Sixteenth Day of June, 2015

Michelle K. Lee
*Director of the United States Patent and Trademark Office*